United States Patent [19]
Nemoto et al.

[11] Patent Number: 5,319,558
[45] Date of Patent: Jun. 7, 1994

[54] ENGINE CONTROL METHOD AND APPARATUS

[75] Inventors: Mamoru Nemoto; Masami Nagano, both of Katsuta, Japan

[73] Assignees: Hitachi, Ltd., Tokyo; Hitachi Automotive Engineering Co., Ltd., Katsuta, both of Japan

[21] Appl. No.: 663,312

[22] Filed: Mar. 1, 1991

[30] Foreign Application Priority Data

Mar. 7, 1990 [JP] Japan .................................. 2-53690

[51] Int. Cl.⁵ .......................................... F02M 51/00
[52] U.S. Cl. .................. 364/431.05; 123/492
[58] Field of Search ................ 364/431.05, 431.03, 364/431.04, 431.07, 148; 123/674, 692, 492, 493, 475, 436

[56] References Cited

U.S. PATENT DOCUMENTS

| | | | |
|---|---|---|---|
| 4,131,087 | 12/1978 | Williams | 123/692 |
| 4,319,327 | 3/1982 | Higashiyama et al. | 364/431.05 |
| 4,640,253 | 2/1987 | Kamai et al. | 123/475 |
| 4,858,136 | 8/1989 | Tanaka et al. | 364/431.05 |
| 4,939,658 | 7/1990 | Sokozawa et al. | 364/431.05 |
| 4,959,789 | 9/1990 | Nakamura | 364/431.05 |
| 5,099,429 | 3/1992 | Onari et al. | 364/431.05 |
| 5,101,795 | 4/1992 | Hirschmann et al. | 123/493 |
| 5,126,943 | 6/1992 | Nakaniwa | 364/431.05 |

FOREIGN PATENT DOCUMENTS

| | | |
|---|---|---|
| 3803952A1 | 8/1989 | Fed. Rep. of Germany . |
| 3926322A1 | 2/1990 | Fed. Rep. of Germany . |
| 2215868A | 9/1989 | United Kingdom . |
| 2221722A | 2/1990 | United Kingdom . |

Primary Examiner—Jack B. Harvey
Assistant Examiner—Ellis B. Ramirez
Attorney, Agent, or Firm—Antonelli, Terry, Stout & Kraus

[57] ABSTRACT

Data for engine conditions such as engine speed (r.p.m.), a flow rate of air taken in each of a plurality of cylinders of the engine, etc. are detected by various sensors; an amount of fuel to be injected into each engine cylinder is calculated repeatedly on the basis of the detected data at fixed time intervals; the calculated amount of fuel is injected into each engine cylinder, wherein the calculated fuel injection amount is injected each cylinder at an optimum fuel injection time in an engine cycle and the calculated fuel amount can be renewed at least once in a time from starting of fuel injection until completion of the fuel injection in an load operation of the engine in which an engine load is larger than in idling.

17 Claims, 21 Drawing Sheets

ENGINE CONTROL METHOD AND APPARATUS

BACKGROUND OF THE INVENTION

The present invention relates to a method of and apparatus for controlling an internal combustion engine using fuel injection valves and, more particularly, to a method of and apparatus for controlling fuel injection of an engine, which method and apparatus are suitable for a multi-point fuel injection type internal combustion engine.

There is a known control method of controlling a fuel injection valve through detection of engine conditions with various sensors, and repeated calculation of a necessary fuel injection amount with a microcomputer on the basis of detected data of the engine conditions.

The fuel injection amount calculation is based on data representative of engine conditions such as values of the intake air flow rate and the engine speed (r.p.m.) N which are inputted to a microcomputer at prescribed crank angles of the engine, so that calculation is effected in synchronism with engine rotation.

This method has a defect in that calculation cycles or intervals are long when the engine is in an idling condition, so that the control delay is remarkable and a precise calculation of a fuel injection amount can not be effected. Further, the method has a defect in that fuel injection to some cylinders is effected always in specific strokes, such as the suction and expansion strokes, and the other cylinders have fuel injected always in compression and exhaust strokes, for example. Therefore, the mixing condition of the fuel air mixture introduced into the cylinders and the staying time of the mixture in the manifold are different for each cylinder, which causes a difference in the fuel-air mixing degree at each cylinder and a variation in engine characteristics for each cylinder. As a whole, the efficiency and performance of the engine are lowered with the conventional method.

JP-A-55-128630 (1980) discloses an engine control method in which the above-mentioned defects are eliminated. In JP-A-55-128630, fuel is injected at fixed time intervals irrespective of the engine rotation, and the fuel injection amount also is calculated at constant intervals of time. With respect to the fuel injection at fixed time intervals according to the method disclosed in this publication, when the method is used in a multi-point fuel injection system, the fuel injection start point from a suction stroke, for example, is not constant, but changes widely, that is, in some cases fuel is injected at the compression stroke, and in other cases fuel is injected in the suction stroke, for instance. When the fuel is injected in the compression stroke, there is a relatively large time interval between a time at which a fuel injection amount is calculated for fuel injection of the compression stroke and a time at which the fuel amount is sucked into the cylinder, which means that the injected fuel amount is based on relatively old data such as the intake air flow rate and engine speed (r.p.m.). Although, when the engine runs at a low engine speed such as during idling, there is substantially no control delay, in case of a high speed operation of the engine, particularly in case of acceleration of the engine, a sufficiently precise fuel injection amount can not be calculated according to the prior art. Therefore, the calculated air ratio sometimes deviates from the theoretical fuel-air ratio, so that purification of exhaust gas is not sufficient even if a three way catalyst is used, and the engine according to the prior art can not keep to the recent strict regulation of exhaust gas.

There is another method of fuel injection control disclosed in JP-B-62-7380 (published February of 1987), wherein fuel injection valves driven at the same time as each other are driven so as to be forcibly opened for a short fixed time period at a fuel injection time, an optimum fuel injection time is calculated according to engine conditions to establish the opening time of the valves, and then the fuel injection valves are closed after lapse of the time of the short fixed time period and the optimum fuel injection time period. According to this method, in usual operation of the engine, the optimum injection time is calculated on the basis of engine condition data obtained only in the short fixed time, and is not calculated after the short fixed time. Further, according to this method, since the injection valves (the number of which are 4 in four cylinder engine) are driven simultaneously to inject fuel, even if one of the valves is opened at an optimum injection time for that engine cylinder in an engine cycle, the injection time for the others may not be optimum. Summary of the Invention An object of the present invention is to provide an engine control method and apparatus wherein a precise fuel injection amount for each engine cylinder can be calculated even if there is a large change in intake air flow rate during acceleration or deceleration, whereby emission of exhaust contamination can be strictly restricted.

According to an aspect of the present invention, data for engine conditions, such as engine speed (r.p.m.) and flow rate of air taken in each of a plurality of cylinders of the engine, is detected by various sensors; an amount of fuel to be injected into each engine cylinder is calculated repeatedly on the basis of the detected data at fixed time intervals; the calculated amount of fuel is injected into each engine cylinder, so that the calculated fuel injection amount is injected into each cylinder at an optimum fuel injection time in an engine cycle and the calculated fuel amount can be renewed at least once in a time period from the start of fuel injection until completion of the fuel injection in a load operation of the engine in which the engine load is larger than that which occurs during idling.

According to the aspect of the invention, when the engine is in a condition in which the flow rate of air sucked into the engine cylinder changes, a calculated value of the fuel injection amount can be renewed and the fuel of renewed value is injected at the optimum injection time, so that fuel in an amount very close to that really required for the engine is injected. Therefore, the fuel-air mixture ratio is not significantly different from the theoretical fuel air ratio and the exhaust gas can be purified sufficiently by a catalyst, for example.

According to our experimental investigation, when the time interval of calculation of fuel injection amount is 5 msec or less, the deviation in air-fuel ratio from a theoretical ratio can be kept within a prescribed value in which the exhaust gas can be purified so as to keep to a strict regulation of exhaust gas, although a time interval of 2 msec is more preferable.

The optimum fuel injection time or position is a position which is close to a starting point of an intake stroke in an engine cycle, such that the fuel injected at the position is fully sucked into the cylinder during the intake stroke of this engine cycle.

In a multi-cylinder type engine, an optimum fuel injection period differs for each cylinder, namely, each cylinder has an optimum fuel injection period with respect to an intake stroke of an engine cycle. According to the present invention, fuel in an amount which is calculated on the basis of newest engine condition data in an engine cycle is injected in each cylinder of the engine at the optimum fuel injection time for each cylinder, so that fuel can be combusted at an optimum fuel-air ratio in each cylinder, and so that the exhaust gas can be purified by a suitable catalyst which is known to be high in conversion rate of CO, HC and NOx at a suitable fuel air ratio.

DESCRIPTION OF THE INVENTION

Figure 1:
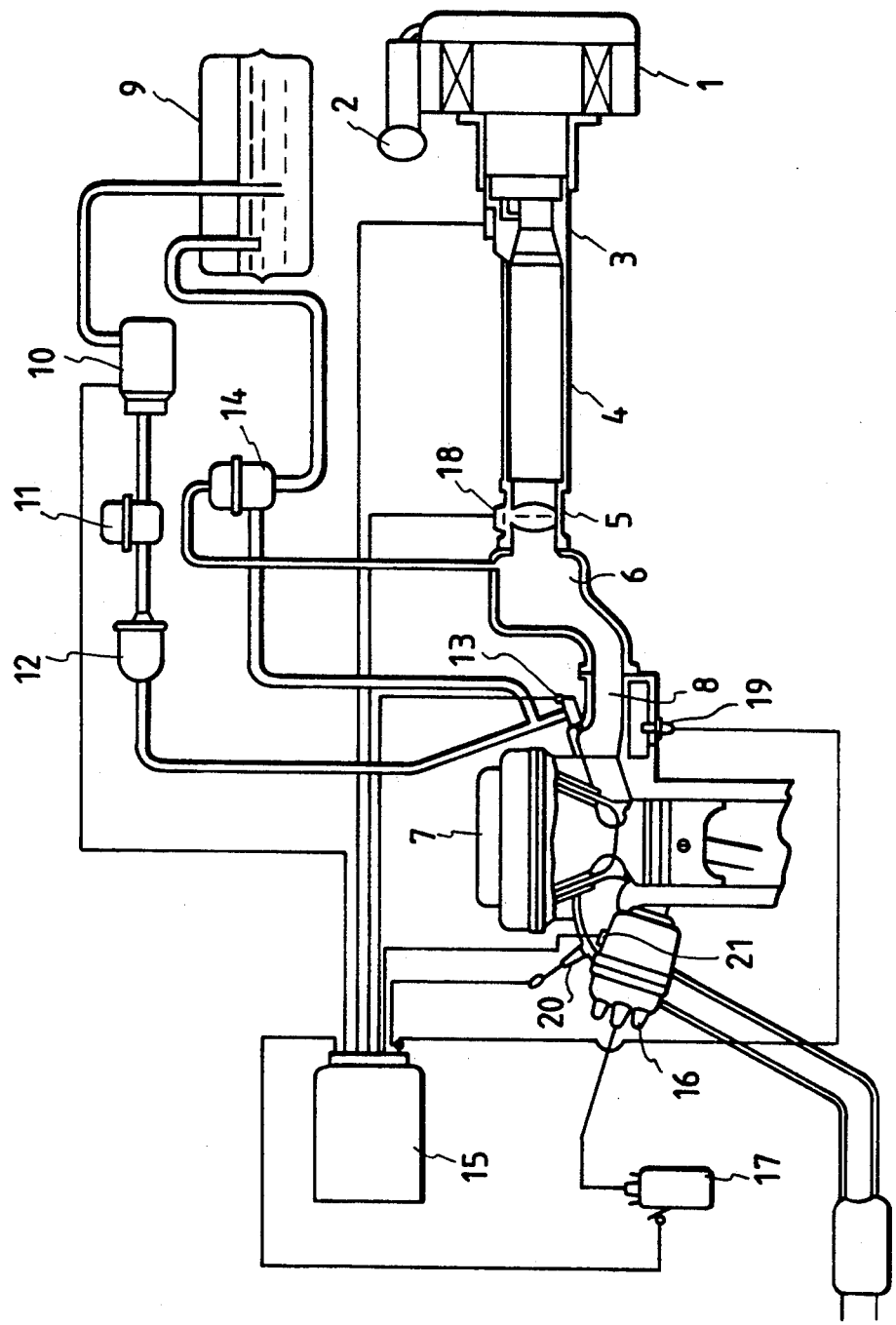
FIG. 1 is a schematic view of a fuel injection system construction.

An embodiment of the present invention will be described by referring to the drawings.

First of all, an electronic-controlled fuel injection system for an internal combustion engine employing the present invention is explained with reference to FIGS. 1 to 3.

In FIG. 1, the fuel injection system comprises an air supply system, a fuel supply system, an ignition system and a control system. The air supply system comprises an air cleaner 1 with an inlet 2 for introducing air into the air cleaner 1, a duct 4, a hot wire type air flow meter having an air flow sensor 3 provided in an air passage between the air cleaner 1 and the duct 4, a throttle body 5 with a throttle valve, a collector 6 and intake pipes 8 each connected to the collector 6 at an upstream side thereof and to engine cylinders at a downstream side thereof. The intake pipes 8 are able to communicate with the cylinders of the engine 7, respectively, that is, each intake pipe 8 communicates with each cylinder when an engine valve is opened and does not communicate when closed.

Air enters the air cleaner 1 at the inlet 2, wherein the air is cleaned. The cleaned air is introduced into the collector 6 through the air flow sensor 3, the duct 4 and the throttle body 5. The air which has entered the collector 6 is distributed into each cylinder through each intake pipe 8.

The fuel supply system comprises a fuel tank 9, a fuel pump 10, a fuel damper 11, a fuel filter 12, fuel injection valves 13 which are provided in the intake pipes 8, respectively, and a fuel regulator 14. Fuel in the fuel tank 9 is sucked and pressurized by the fuel pump 10, and supplied to the fuel injection valves 13 through the fuel damper 11 and the fuel filter 12. The fuel regulator 14 regulates the pressure of fuel before injection to keep it constant. The fuel regulated in pressure is injected into the intake pipes 8 whereby the engine is supplied with fuel.

The control system comprises a control unit 15 and various sensors including an air flow sensor 3, a throttle sensor 18, a water temperature sensor 19, an $O_2$ sensor 20, a crank angle sensor 21, etc. The air flow sensor 3 detects a flow rate of air introduced into the engine 7 and outputs a signal corresponding to the flow rate to the control unit 15. The throttle sensor 18 mounted on the throttle body 5 detects the opening degree of the throttle valve, and outputs a signal corresponding to the opening degree to the control unit 15. The water temperature sensor 19 is mounted on a body of the engine 7 to detect the temperature of the engine 7. A signal from the water temperature sensor 19 also is sent to the control unit 15.

The ignition system comprises a distributor 16 and an ignition coil 18. In the distributor 16, the crank angle sensor 21 is provided to output reference signals of injection timing and ignition timing and signals for detection of the number of revolutions of the engine to the control unit 15.

Figure 2:
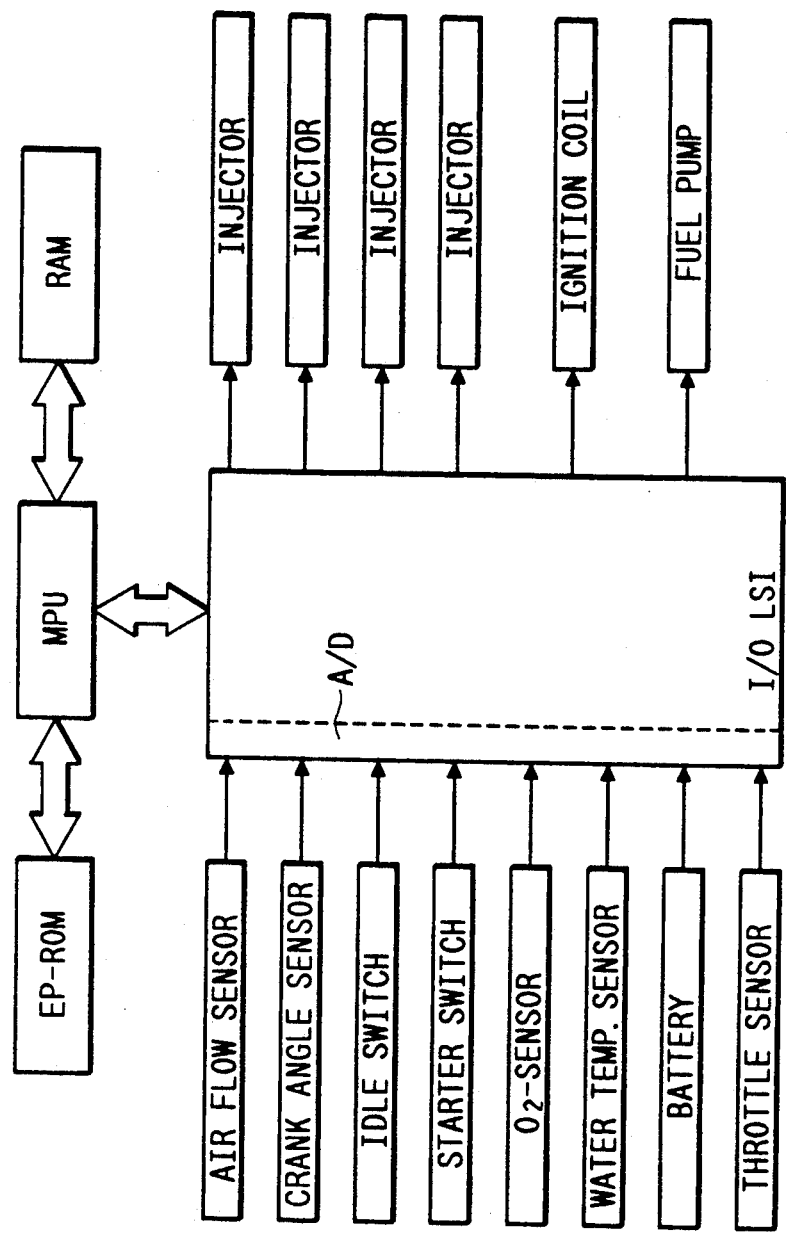
FIG. 2 is a block diagram of a control system.

The control unit 15 comprises a MPU (main processing unit), a ROM (read only memory), a RAM (random access memory), and A/D converter (analog/digital converter) and an I/O (input/output device), as shown in FIG. 2. The control unit 15 is constructed so that a prescribed arithmetic operation or calculation is carried out on the basis of various signals from various sensors, switches etc. as shown in FIG. 2, for example, signals from the air flow sensor 3, the crank angle sensor 21 mounted in the distributor 16 to operate the fuel injection valve 13 according to the result of the arithmetic operation, whereby a necessary amount of fuel is injected to each intake pipe 8. The control unit 15 controls the ignition timing by sending signals as a result of the arithmetic operation to a power transistor of the ignition coil 17.

Figure 3:
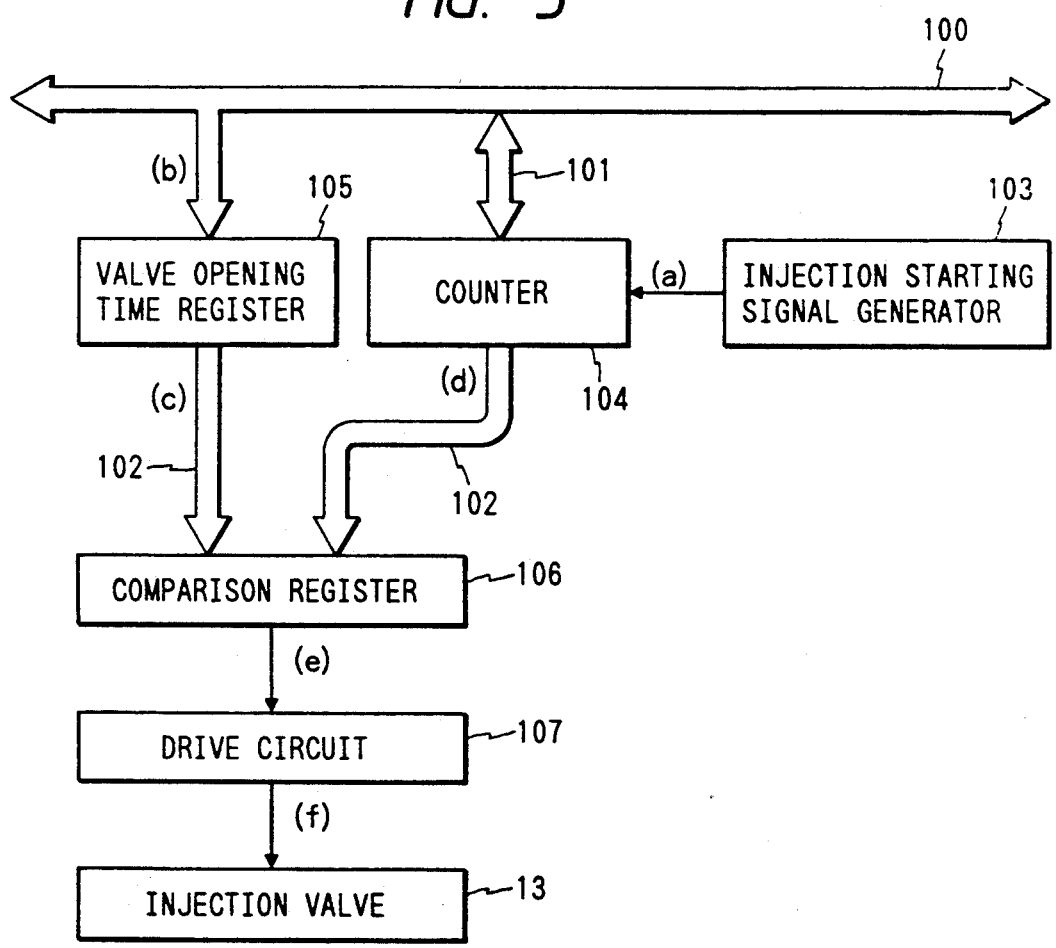
FIG. 3 is a block diagram of a circuit for driving fuel injection valves.

A control of the fuel injection valve 13 is described more definitely referring to FIG. 3.

FIG. 3 illustrates a circuit for operating the fuel injection valve 13, which is electrically connected to and operated by a drive circuit 107.

The drive circuit 107 is connected to a microcomputer of the control unit 15. The microcomputer comprises a register 105 for holding a value indicating a valve opening time, a counter 104 monitoring the lapse of time of the valve opening, a fuel injection start signal generator 103 for generating an injection start signal indicating fuel injection start, a comparison register 106 outputting a control signal when a value of the register 105 and a value of the counter 104 coincide, and data buses 100, 101 and 102.

An injection start signal generated in the injection start signal generator 103 is sent to the counter 104 and the valve opening time indication register 105 through the data buses 101 and 100. The comparison register 106 outputs a signal of "high" level to the drive circuit 107 to open the injection valve 13 when the injection start signal (a) is inputted to the counter and a signal of "low" level to the drive circuit 107 to close the injection value 13 when the value of the counter 104 becomes larger than the value of the register 105. In this manner, the injection valve 13 is controlled so that a prescribed fuel amount is injected at a prescribed time. Determination of the prescribed fuel amount and the prescribed fuel injection time will be described later.

Figure 4:
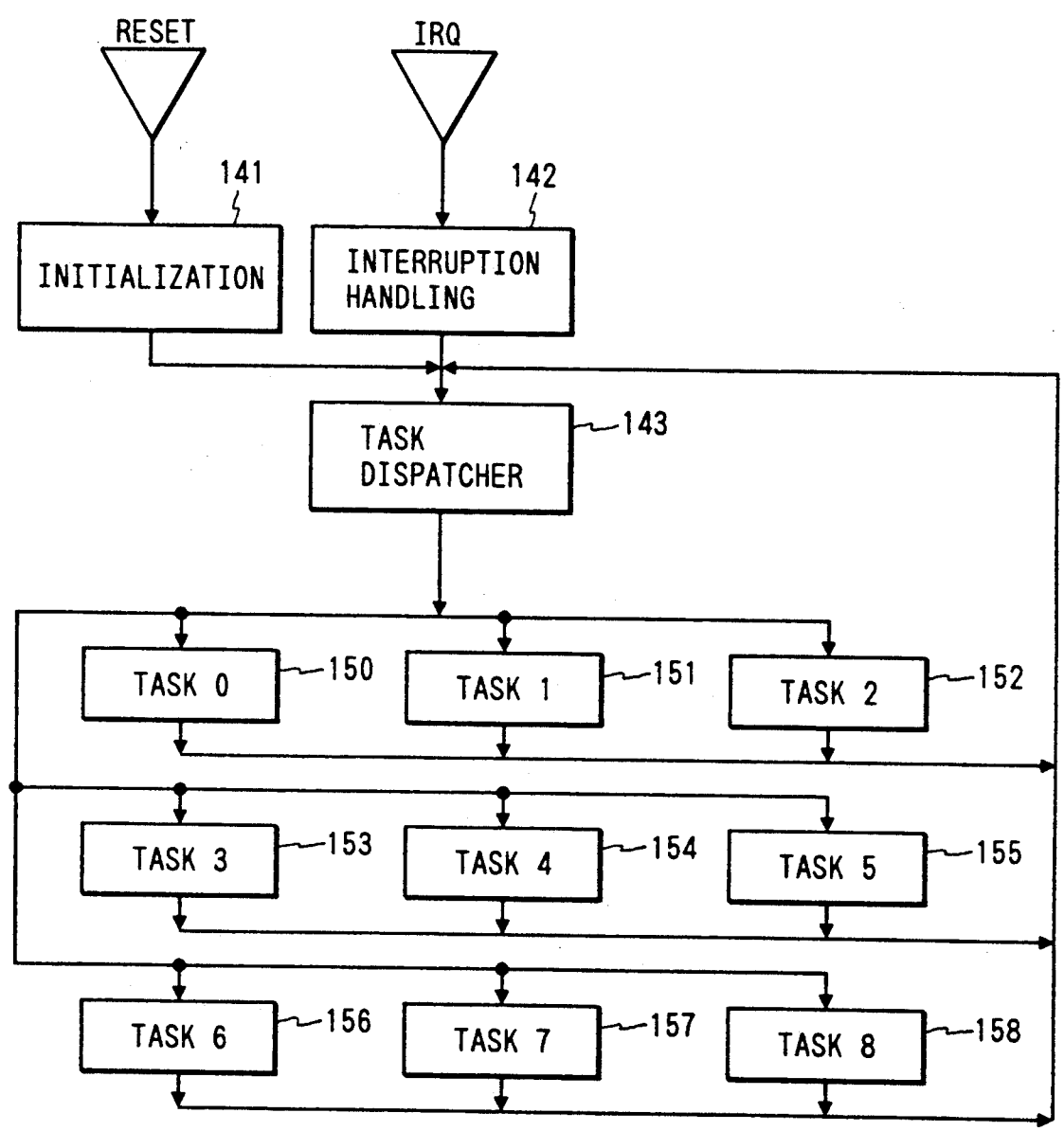
FIG. 4 is a block diagram of a fundamental structure of program of MPU used in the control system.

FIG. 4 shows a principle construction of a program system of the MPU.

In FIG. 4, an initialization program 141, an interruption handling program 142 and a task dispatcher 143 are control programs for controlling a group of tasks 0 to 8. The initialization program 141 is a program for carrying out a pretreatment for operation of the microcomputer, for example, clearing of a memory content of the RAM, setting of an initial value of I/O registers, and treatment for taking in input information for pretreatment necessary to control the engine, for example, data indicating water temperature, battery voltage, etc. Further, the interruption handling program 142 receives various kinds of interruption, analyzes interruption factors and sends drive requests for driving a necessary task(s) in the tasks 150 to 158 to the task dispatcher 143. The interruption factors include interruption occurring synchronously with engine speed, interruption occurring at each set time interval, for example, at an interval of 5 ms, 10 ms, and interruption occurring when a stop state of the engine is detected.

Each of the tasks 150 to 158 has an allotted task number representing priority for any of task levels 0 to 2. Namely, the tasks 0 to 2 belong to a task level 0, the tasks 3 to 5 to a task level 1 which is lower than task level 0, and the tasks 6 to 8 to a task level 2 which is lower than task level 1.

The task dispatcher 143 inputs drive requests of the above-mentioned various kinds of interruption, allots occupation time of the MPU on the basis of the priority allotted to each task corresponding to the drive request. When the drive request of a task having a higher task level is inputted, the task which is being driven and which is lower in task level than the task now requested is interrupted, and the occupation time of the MPU is allotted for the task which is higher in task level.

An operation of the MPU for obtaining an injection start time period Tinjst and for setting a fuel injection time Ti in the valve opening register 105 will be described referring to FIG. 5.

Figure 5:
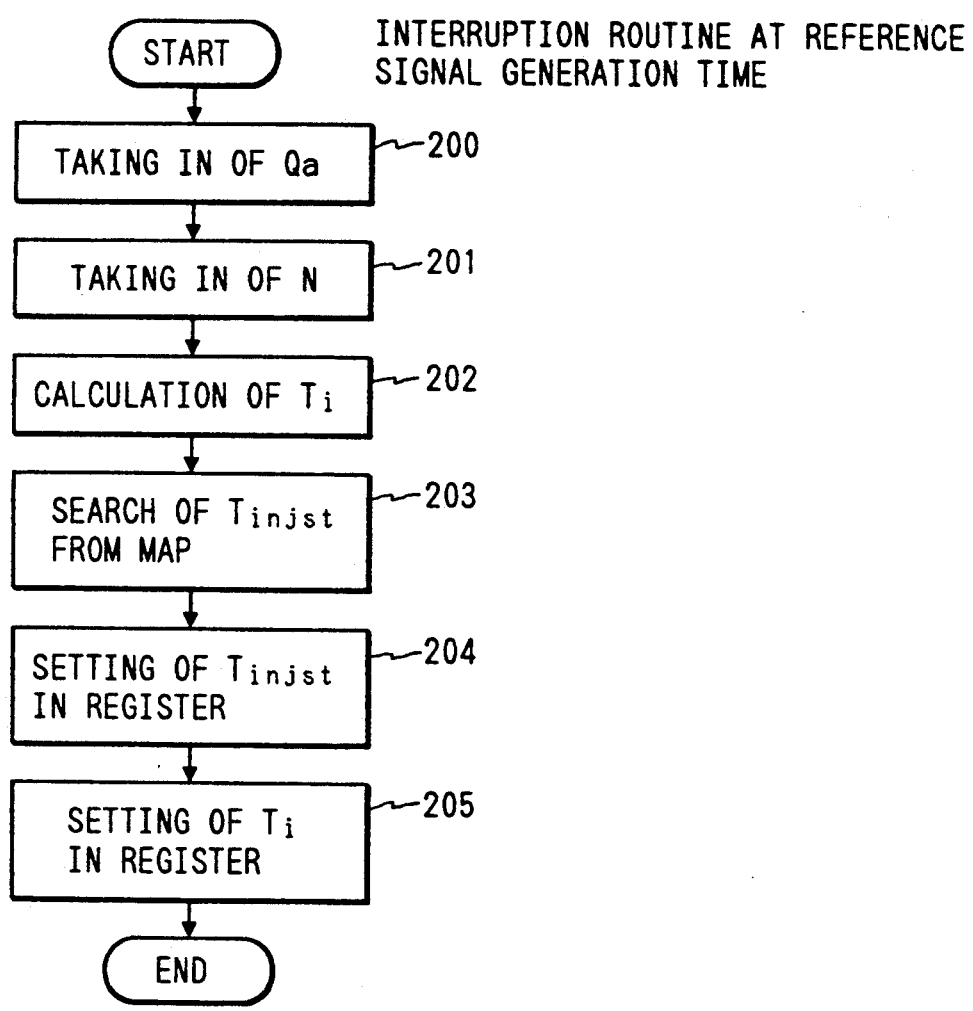
FIGS. 5 and 6 each are a flow chart of an operation of MPU according to an embodiment of the present invention.
Figure 7:
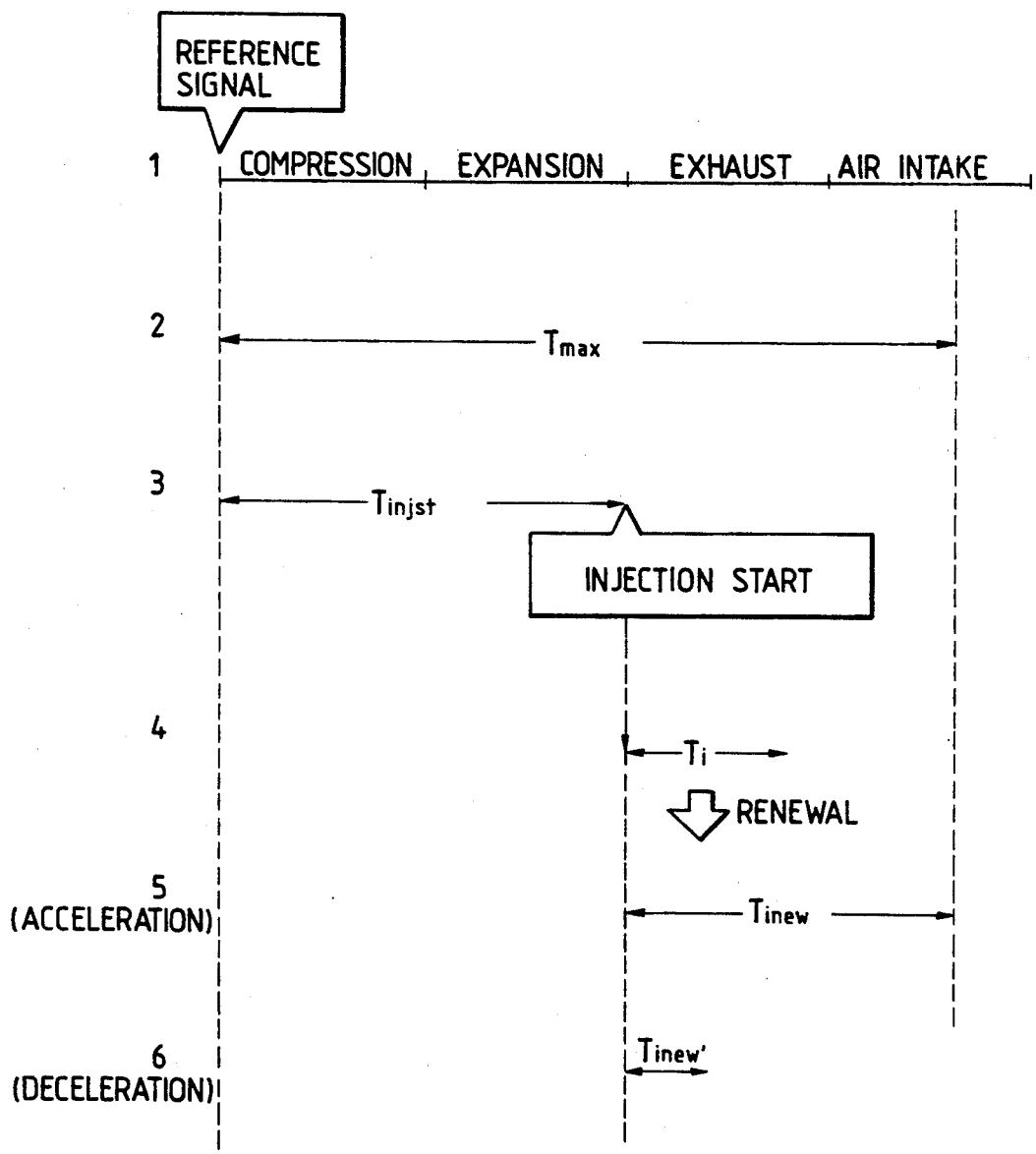
FIG. 7 is a timing chart showing renewal of a register according to the embodiment of present invention.

In FIG. 5 showing an interruption routine at a reference signal generation time, an arithmetic operation is effected for a valve opening start position or time of opening the fuel injection valve 13 according to the timing chart shown in FIG. 7. The reference signal is outputted when the crank shaft of the engine reaches a position immediately before the compression stroke, that is, immediately after termination of the intake stroke, as shown in FIG. 7. The fuel injection start time period Tinjst defines a time at which the fuel injection valve 13 is opened following the reference signal generation time. When the reference signal is outputted, an interruption is required for the MPU, and the A/D converter is operated to take in flow rate Qa of air to be taken in the engine in step 200. In step 201, the r.p.m. of the engine is taken in.

In step 202, an arithmetic operation is effected for obtaining a fuel injection amount Ti at this time, based on the (r.p.m.) N of the engine and the flow rate Qa of air to be taken in.

Fuel injection start time Tinjst is stored in the ROM as a three-dimensional map of the engine speed (r.p.m.) N and the fuel injection time Ti, and read out by searching the map along the indication of N and Ti in step 203. The fuel injection start time Tinjst corresponding to the engine speed N and the fuel injection time Ti is set into a fuel injection start time register in step 204. At the same time, the fuel injection time Ti is set into the valve opening time register 105, whereby the routine is complete.

The fuel injection start time is experimentally determined to satisfy the following relation:

$$Tinjst \leq Tmax - Ti$$

wherein Tmax is a time period which defines the maximum fuel injection start time. The maximum fuel injection start time Tmax is the latest position that fuel can be injected in an engine cycle and be fully sucked within the engine cycle, and is obtained by the following relation:

$$Tmax = \frac{720 \times 60 \times 1000}{2 \times N} - Tdel(ms)$$

wherein N is engine rotational number (r.p.m.); Tdel, a fuel arrival time.

The fuel arrival time Tdel is the time it takes for the injected fuel to arrive at a suction valve of the engine cylinder after the fuel injection, and the value thereof changes according to the type of engine. Therefore, the fuel arrival time is given as a function of N and Tp (Tdel=f(N,Tp)). More definitely, Tdel is experimentally obtained, and the values are stored in the ROM as a three-dimensional map of N and Tp, wherein Tp is a fundamental fuel injection time given by the following equation:

$$Tp = KQa/N$$

in which K is a constant.

Calculation of the fuel injection time Ti, which is effected in the MPU at fixed time intervals, and setting of the calculated fuel injection time Ti in the valve opening time indication register 105 will be explained, referring to FIG. 6. The fixed time interval is preferably 5 msec or less, the significance of which will be explained later. In this embodiment, 5 msec is used.

Figure 6:
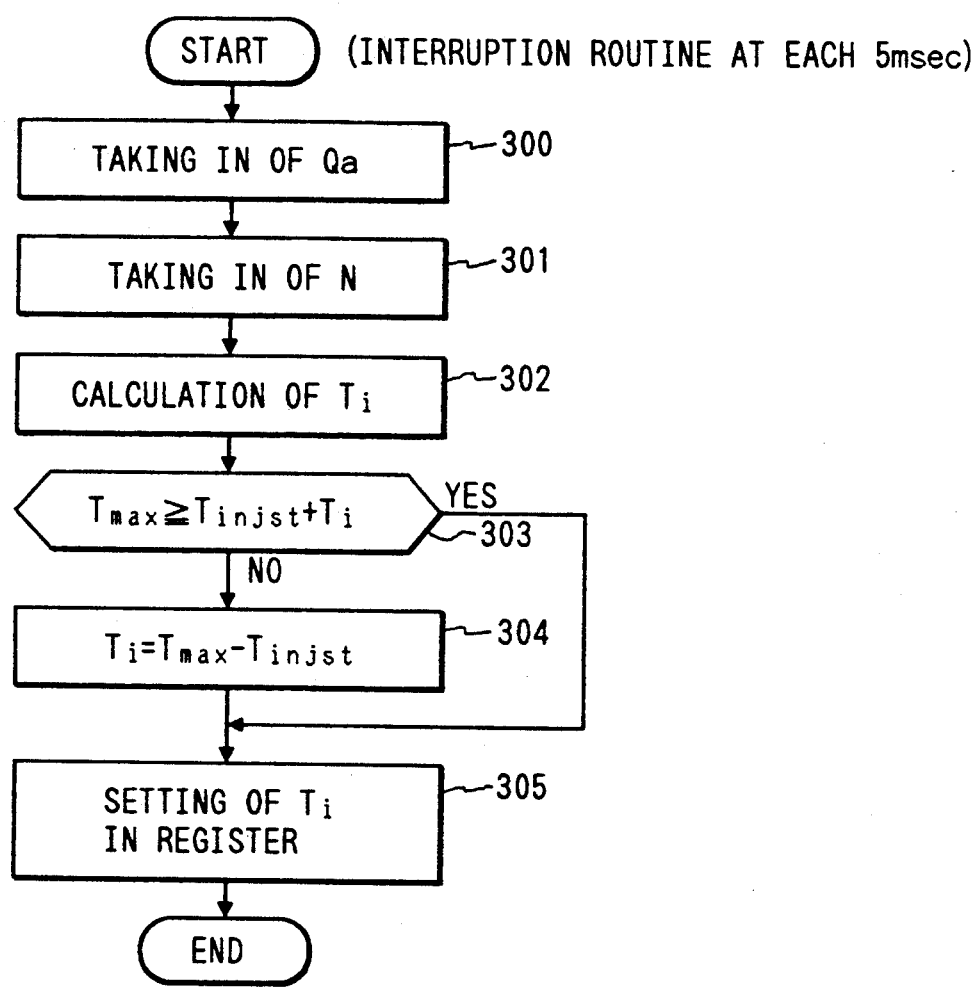

FIG. 6 shows a flow chart for the interruption handling routine which is performed at each 5 msec. In the routine illustrated in this flow chart, a fuel injection amount Ti is calculated every 5 msec, and at each time when the fuel injection amount Ti is obtained, it is set into the valve opening time indication register 105. When 5 msec has passed from the previous interruption, another interruption is applied to the MPU, whereby the A/D converter is driven to take in the intake air flow rate Qa in step 300. In the 301, the engine speed N is taken in. A fuel injection amount or time Ti is calculated on the basis of the intake air flow rate Qa and the engine speed N in step 302. Namely, the fuel injection amount Ti is calculated on the basis of the newest information or latest data.

In step 303, it is judged whether or not the fuel injection valve 13 can inject all of the fuel injection amount Ti calculated as mentioned above within the final fuel injection time Tmax. Namely, it is judged whether the fuel injected by the injection valve 13 can be taken in effectively in the cylinder before termination of the intake stroke. The fuel injected after the final fuel injection time Tmax is not taken in the cylinder. In FIG. 7, the final fuel injection time Tmax from a generation time of the reference signal to the final injection time is shown. The judgment is effected to determine whether or not the following equation (1) is satisfied. If it is satisfied, fuel injection for the fuel injection time Ti corresponding to the calculated fuel injection amount can be effected.

$$Tmax \geq Tinjst + Ti \quad (1)$$

When the equation (1) is satisfied, the processing goes to step 305 in which the calculated fuel injection time Ti is set into the valve opening time indication register 105, whereby the flow is ended.

In step 303, when the equation (1) is not satisfied, continuation of fuel injection on the basis of the calculated fuel injection time Ti goes beyond the final injection time. Therefore, the fuel injection time Ti to be calculated is confined according to the following equation (2) in step 304:

$$Ti = Tmax - Tinjst \quad (2)$$

In step 304, the fuel injection time Ti is calculated according to the equation (2), and the calculated value is set into the valve opening indication register 105, whereby the flow is ended. Operation according to the flow chart is the task O shown in FIG. 4, which task is the highest in task level.

Referring to FIG. 7, this embodiment of the present invention is explained. When the reference signal is outputted immediately before the compression stroke of an engine cycle, the MPU is operated to proceed to the process shown in FIG. 5 in which the fuel injection start time Tinjst and the fuel injection time Ti are obtained. In this case, when the engine is in acceleration, the flow rate Qa of air taken in the engine increases according to the degree of depression of the accelerator pedal. The MPU executes the calculation of fuel injection time Ti according to the flow chart of FIG. 6, which is executed at fixed short intervals, such as 5 msec, independently of the engine rotation. The fuel injection time Ti obtained according to FIG. 5 can be renewed by Ti calculated on the basis of newest data of Qa and N according to FIG. 6, for example, Tinew in such a case of acceleration or Tinew' in case of deceleration. In acceleration, the renewal may be effected 3 or more times.

The fuel injection valve 13 is opened on the basis of the newest data of Ti.

When the fuel injection is to be effected beyond the final fuel injection time Tmax, the fuel part to be injected beyond Tmax is not sucked in the engine cylinder within the instant engine cycle, and so is left in the manifold. In the next engine cycle, when the correct fuel amount is obtained, the left fuel part represents excess fuel in the cycle, so that fuel-air ratio becomes unsuitable. Therefore, the fuel injection should be effected within Tmax.

Figure 8:
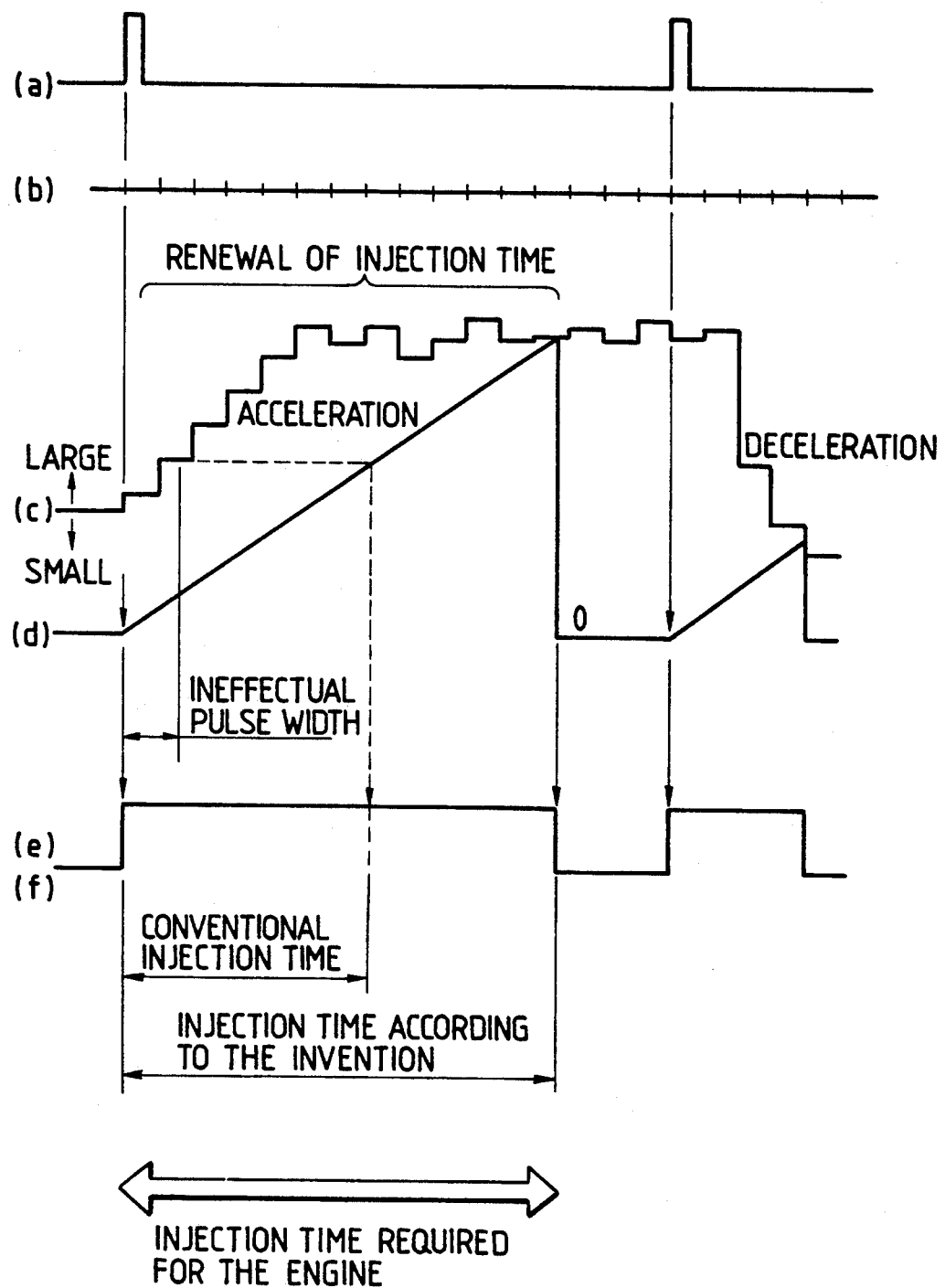
FIG. 8 is a timing chart for explaining an operation of the present invention.

Referring to FIG. 8, the embodiment of the invention will be explained further.

In FIG. 8, the fuel injection start signal (a) is outputted as a pulse from the fuel injection start signal generator 103.

The calculation cycle or interval of the fuel injection amount or time Ti is as shown by (b). In order to provide a clear explanation, very short calculation intervals ar taken. The fuel injection time Ti is calculated at each calculation cycle, for example, at a time interval of 5 msec and the calculated value (c) corresponding to the fuel injection time Ti is stored in the valve opening time indication register 105. The value (c) stored in the register 105 is renewed by a newest fuel injection amount Ti which is calculated on the basis of the newest intake air flow rate Qa and the newest engine speed N. Namely, the value stored in the register 105 is renewed, based on the newest data obtained during every calculation interval of 5 msec, for example.

The counter 104 which monitors valve opening time passage increments a counted value as shown by (d).

The injection valve 13 is opened when the comparison register 106 inputs the fuel injection start signal through the counter 104, that is, when the value in the counter is not 0, that is, the comparison register 106 and the drive circuit 107 are constructed so as to open the injection valve 13 when the counter 5 starts.

When the value (d) in the counter 104 goes beyond the value (c) in the register 105, the counter 104 is reset (its value is made 0), whereby the injection valve 13 is closed as shown by (e) and (f).

According to this embodiment, a fuel injection time which is very close to the fuel injection time required for the engine is obtained. On the other hand, the conventional fuel injection time is shown by a dotted line, which time is shorter than the fuel injection time required for the engine.

Figure 9:
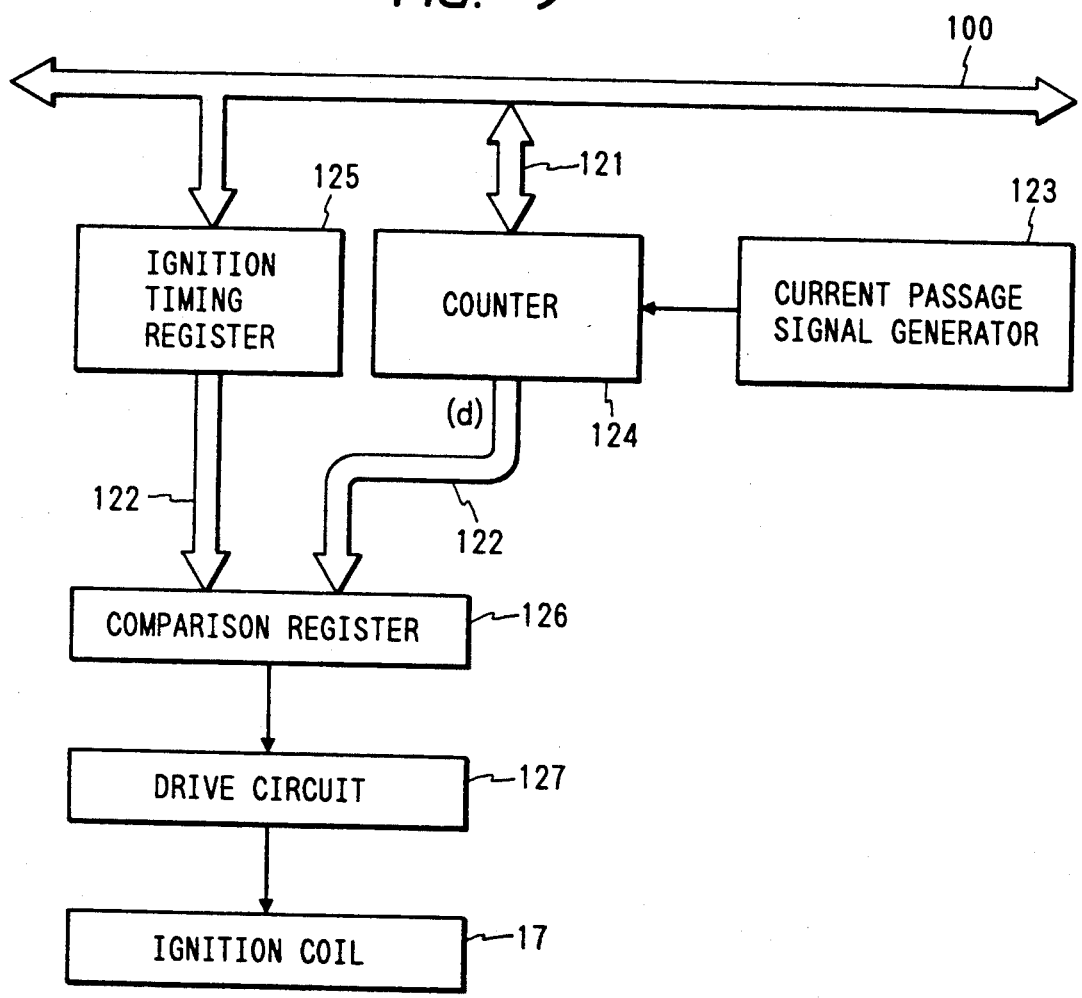
FIG. 9 is a block diagram of a circuit for driving an ignition coil.

FIG. 9 shows a circuit for sending ignition signals to the ignition coil 17. The ignition coil 17 is electrically connected to a drive circuit 127 which is connected to the microcomputer which comprises a current passage signal generator 123 for generating a current passage signal to instruct starting of current passage, a counter 124 for monitoring a current passage time, a register 125 for a ignition timing, a comparison register 126, and data buses 100, 121 and 122.

A signal generated in the current passage signal generator 123 is sent to the counter 124. When the counter 124 receives the current passage signal, the comparison register 126 outputs a signal of "high" level thereby the start of flow current in the coil 17. At the same time, the counter 124 starts to count. When the value of the counter 124 becomes larger than the value of the register 125, the comparison register 126 outputs a signal of "low" level to the drive circuit 127, which causes the ignition coil to ignite.

In this manner, the ignition is effected at a suitable timing.

Figure 10:
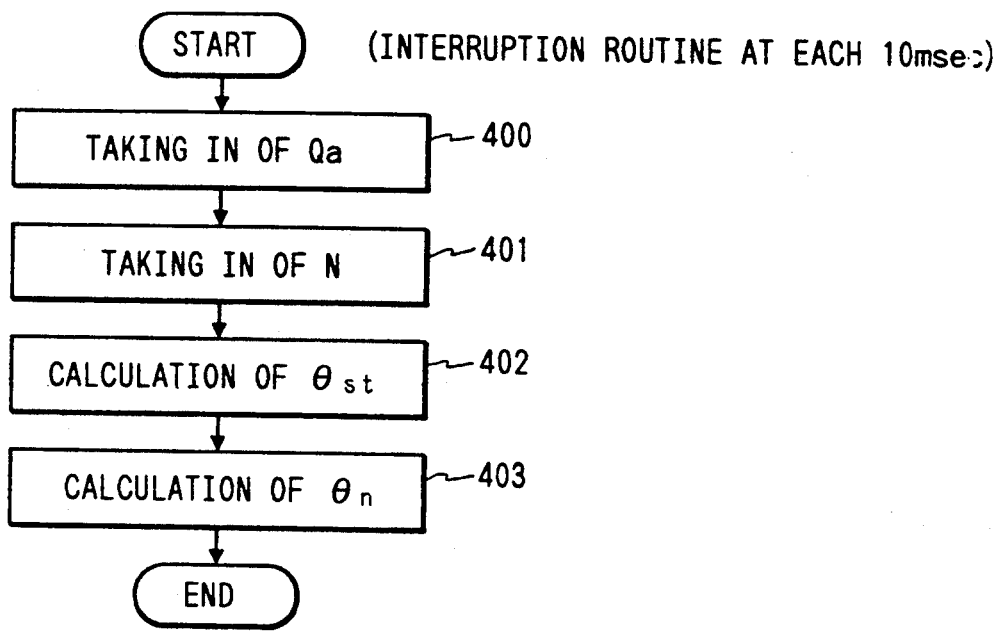
FIG. 10 is a flow chart showing an operation of MPU.

Ignition timing calculation is explained with reference to FIG. 10 showing each 10 msec interruption routine. The flow chart of FIG. 10 shows an arithmetic operation of ignition timing $\theta n$, etc. performed every 10 msec. Upon the passage of 10 msec from a previous interruption, the MPU is subjected to interruption. In step 400, the A/D converter is operated to take in intake air flow rate Qa. In step 401, engine r.p.m. (N) is taken in. The electric current supply start time period $\theta$st is calculated on the basis of the intake air flow rate Qa and the engine r.p.m. (N) in step 402. In step 402, a current passage start tine $\theta$st is calculated on the basis of the intake air flow rate Qa and the engine speed N. Ignition timing an also is calculated in step 403. The calculated current passage start time $\theta$st and the ignition timing an are stored in the current passage start time indication register and the ignition timing register, respectively, at each prescribed crank angle in synchronism with the engine speed N.

The operation of this flow is a task 4 shown in FIG. 4, which task 4 belongs to a task level 1.

The relationship between air fuel ratio and the calculation cycle or interval during acceleration and deceleration will be described referring to FIGS. 11 to 16.

Figure 11:
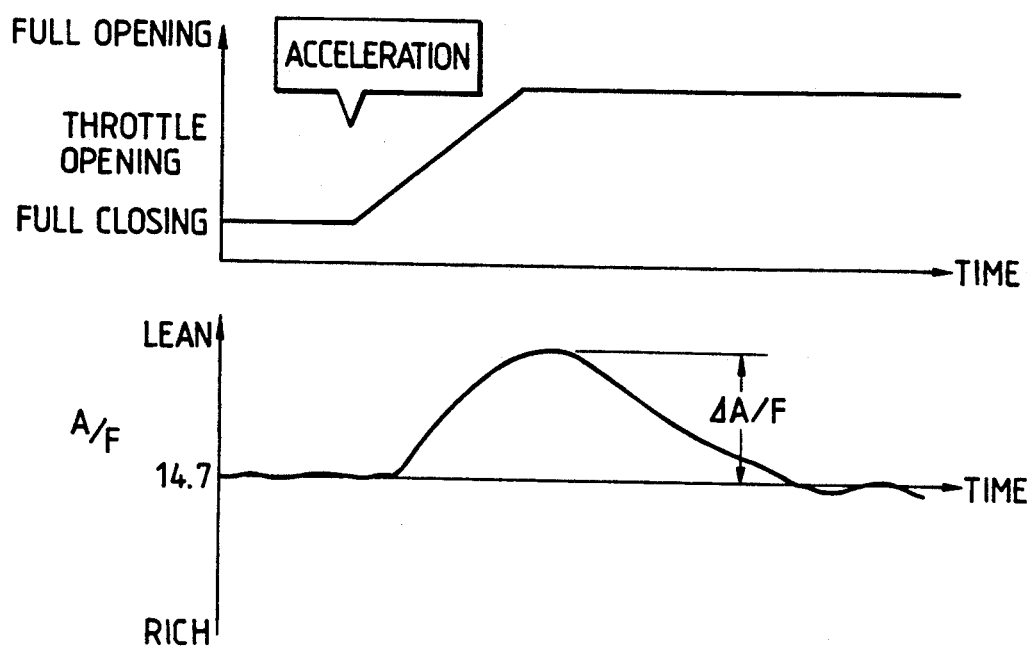
FIG. 11 is an illustration showing change in air-fuel ratio at acceleration.

In FIG. 11, when a driver depresses the accelerator pedal to accelerate the engine, the throttle valve is opened to increase the amount of intake air. In general, the amount of fuel injection is determined through calculation on the basis of a value of intake air flow rate and a value of engine speed (r.p.m.).

When the throttle valve is opened, the intake air amount increases immediately. On the other hand, since the fuel injection amount is calculated at prescribed intervals of time, the fuel injection amount is determined a little later. The fuel injection amount calculated on the basis of an intake air flow rate before acceleration is used during acceleration after the start of acceleration until the fuel injection amount is obtained, based on the intake air flow rate detected after the start of acceleration. Therefore, the intake air flow rate becomes excessive temporarily, whereby the air-fuel mixture becomes in a fuel lean state.

Figure 12:
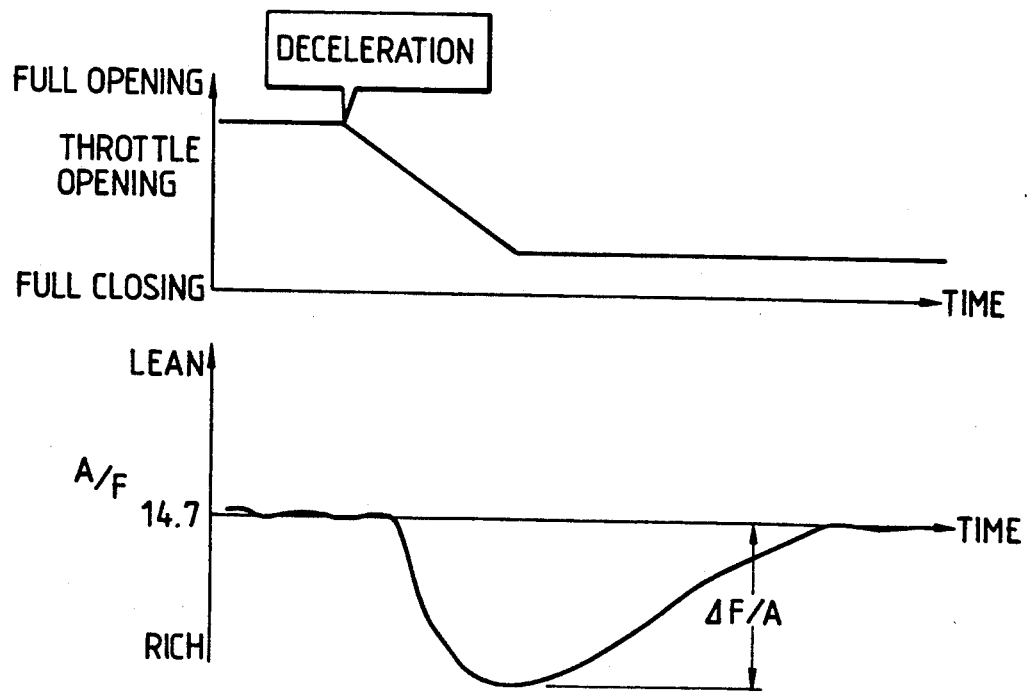
FIG. 12 is an illustration showing change in air-fuel ratio at deceleration.

As shown in FIG. 12, when the driver releases the accelerator pedal to decelerate the engine, the throttle valve is closed to decrease the intake air flow rate. However, the fuel injection amount does not decrease immediately for the above-mentioned reason, sc that the fuel injection amount becomes excessive temporarily, whereby the fuel-air mixture becomes rich.

Figure 13:
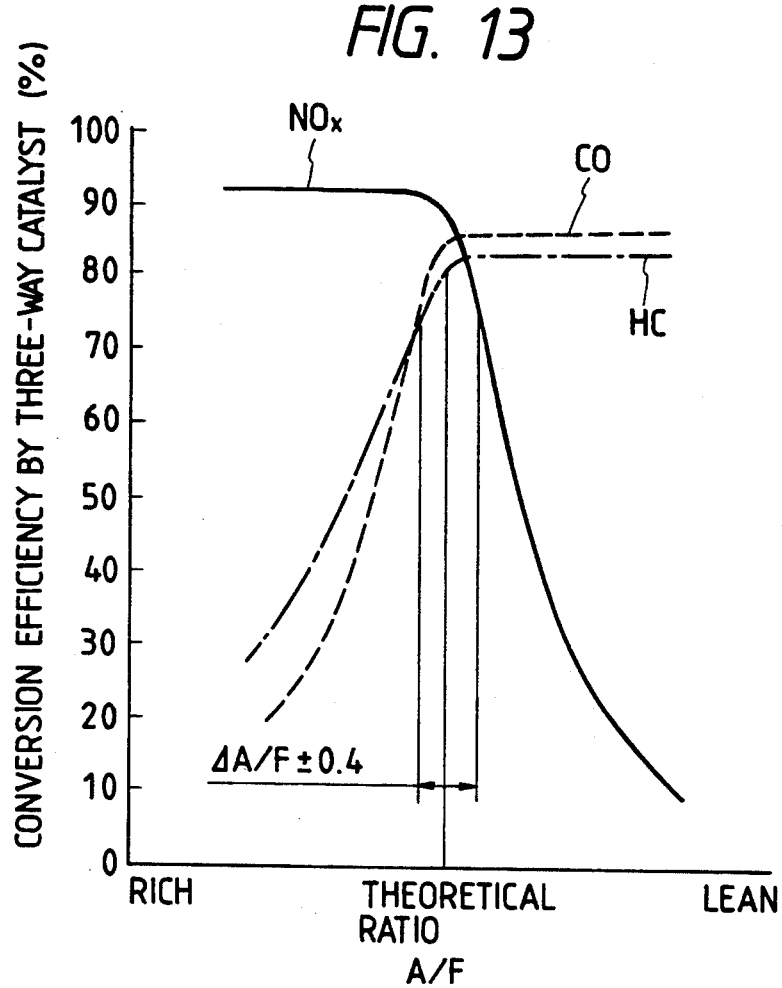
FIG. 13 is graphs showing convention efficiency of a catalyst relative to air-fuel ratio.

Exhaust gas wasted into the atmosphere through an exhaust pipe is purified with a three-way catalyst. The conversion rate of the three way catalyst is as shown in FIG. 13. In general, it is said that the catalyst can purify the exhaust gas sufficiently when the air-fuel ratio is within a range of the theoretical air-fuel ratio (14.7)±0.4.

This will be explained further more in detail.

Figure 14:
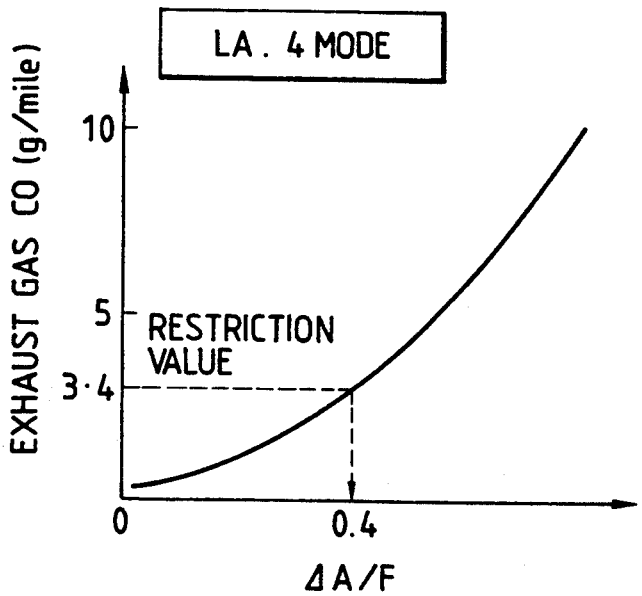
FIG. 14 is a characteristic curve showing an amount of CO relative to deviation of air-fuel ratio to the theoretical air-fuel ratio.

Components contained in the exhaust gas can be represented by CO. The content value of CO is required to be 3.4 g/mile or less, as in LA-4 mode (North American Exhaust Gas Restriction Driving Mode). The value can be restricted to 3.4 or less by restricting the deviation $\Delta A/F$ of the theoretical air-fuel ratio to within 0.4 as shown in FIG. 14.

Figure 15:
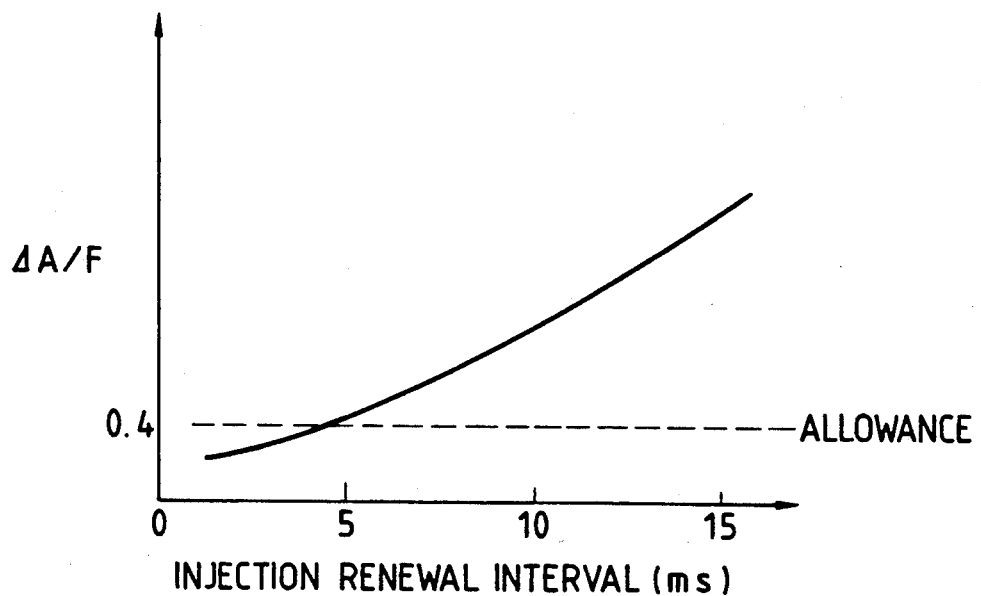
FIGS. 15 and 16 each are a graph showing a relation between a deviation of air-fuel ratio to the theoretical air-fuel ratio and fuel injection time renewal intervals.
Figure 16:
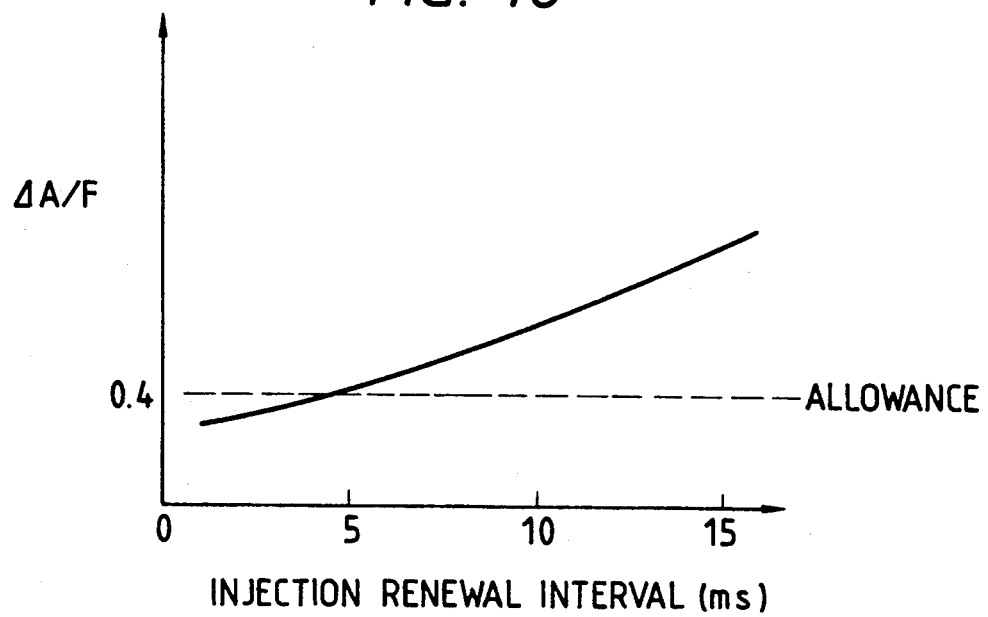

According to experimental data relative relationships between renewal intervals of the fuel injection time and deviation in an air-fuel ratio from the theoretical air-fuel ratio are as shown in FIGS. 15 and 16. FIG. 15 shows deviation of air-fuel ratio at acceleration and FIG. 16 shows deviation at deceleration. As it is noted from FIGS. 15 and 16, when the renewal interval of fuel injection time is 5 msec or less, the deviation from the theoretical air fuel ratio can be within±0.4 in both cases of acceleration and deceleration.

As for the fuel injection start position or time Tinjst, there is an optimum range in view of (1) noxious gases such as HC, CO, and (2) change in an air-fuel ratio at the time of acceleration.

Figure 17:
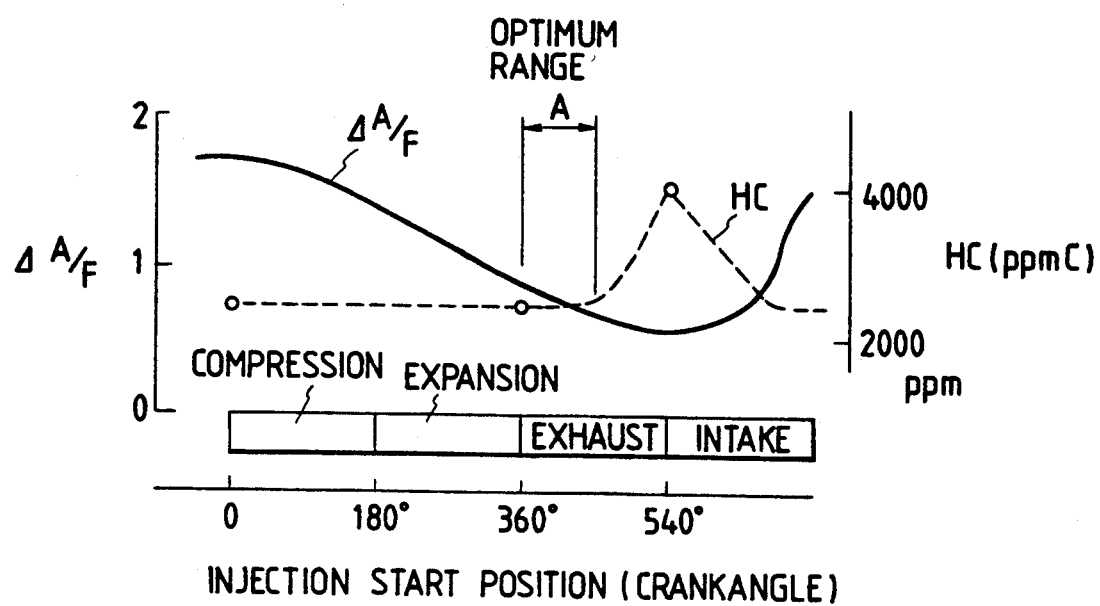
FIG. 17 is graphic illustration explaining relations between air-fuel ratio change, harmful gas and injection start position.

As shown in FIG. 17, as the fuel injection start position approaches the intake (suction) stroke of an engine cycle, the noxious gases increase. Therefore, it is necessary to perform fuel injection apart from the intake suction stroke to reduce the emission of noxious gases. Further, change in air-fuel ratio is relatively small when fuel injection starts at the time of the exhaust stroke and an earlier half of the intake stroke. Therefore, a suitable fuel injection start time or position is a time during the expansion and exhaust strokes, and an optimum range A is the earlier half of the exhaust stroke, for example. Anyway, any engine has an optimum fuel injection start time for each engine cylinder.

Another embodiment of the present invention will be described referring to FIGS. 18a and 18b.

In this embodiment, the system construction, the interruption handling routine at the reference signal generation time, and the interruption routine at each 10 msec interval are the same as in the above-mentioned embodiment.

Figure 18A:
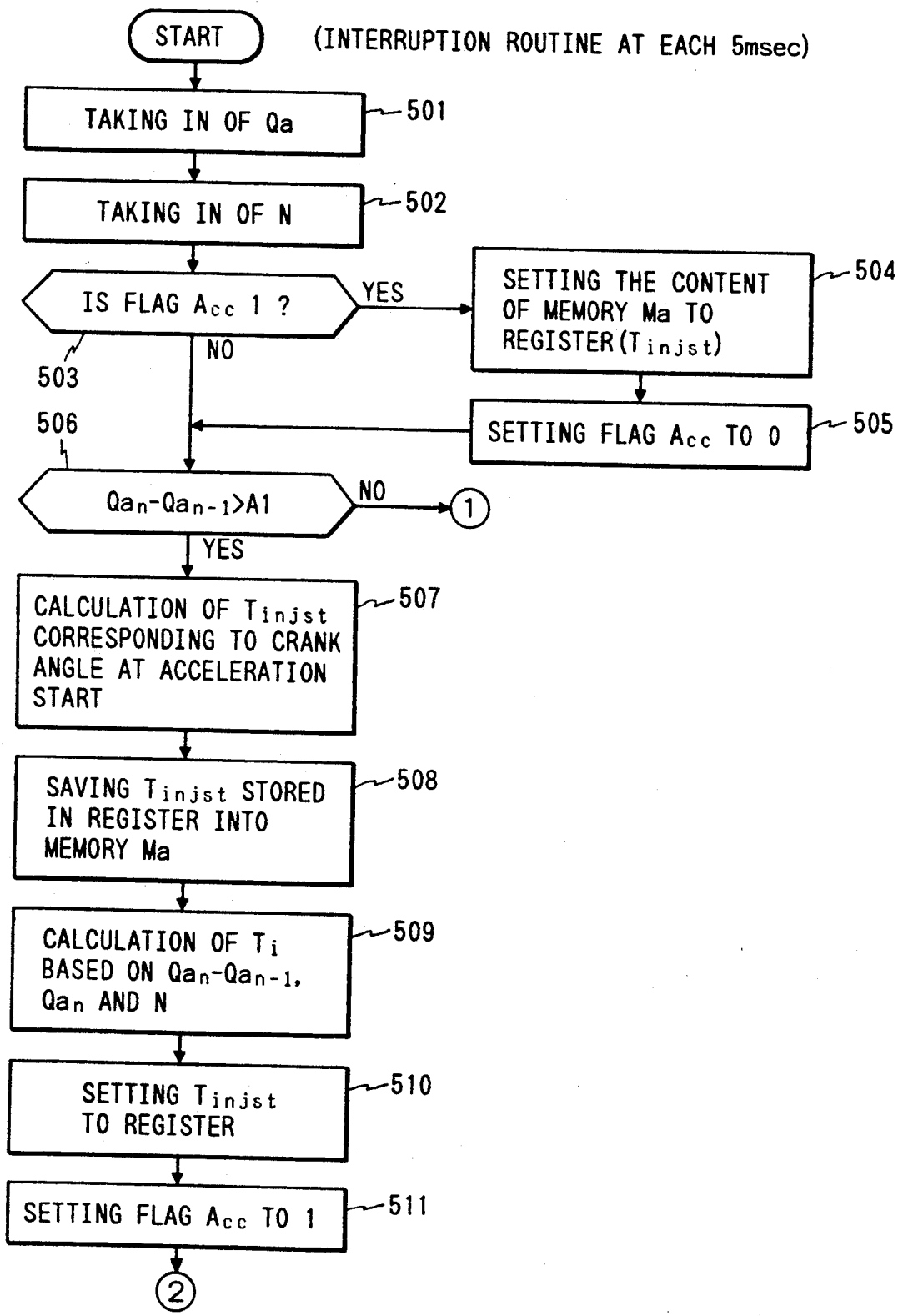
FIGS. 18a and 18b each are a flow chart showing another embodiment of the present invention.
Figure 18B:
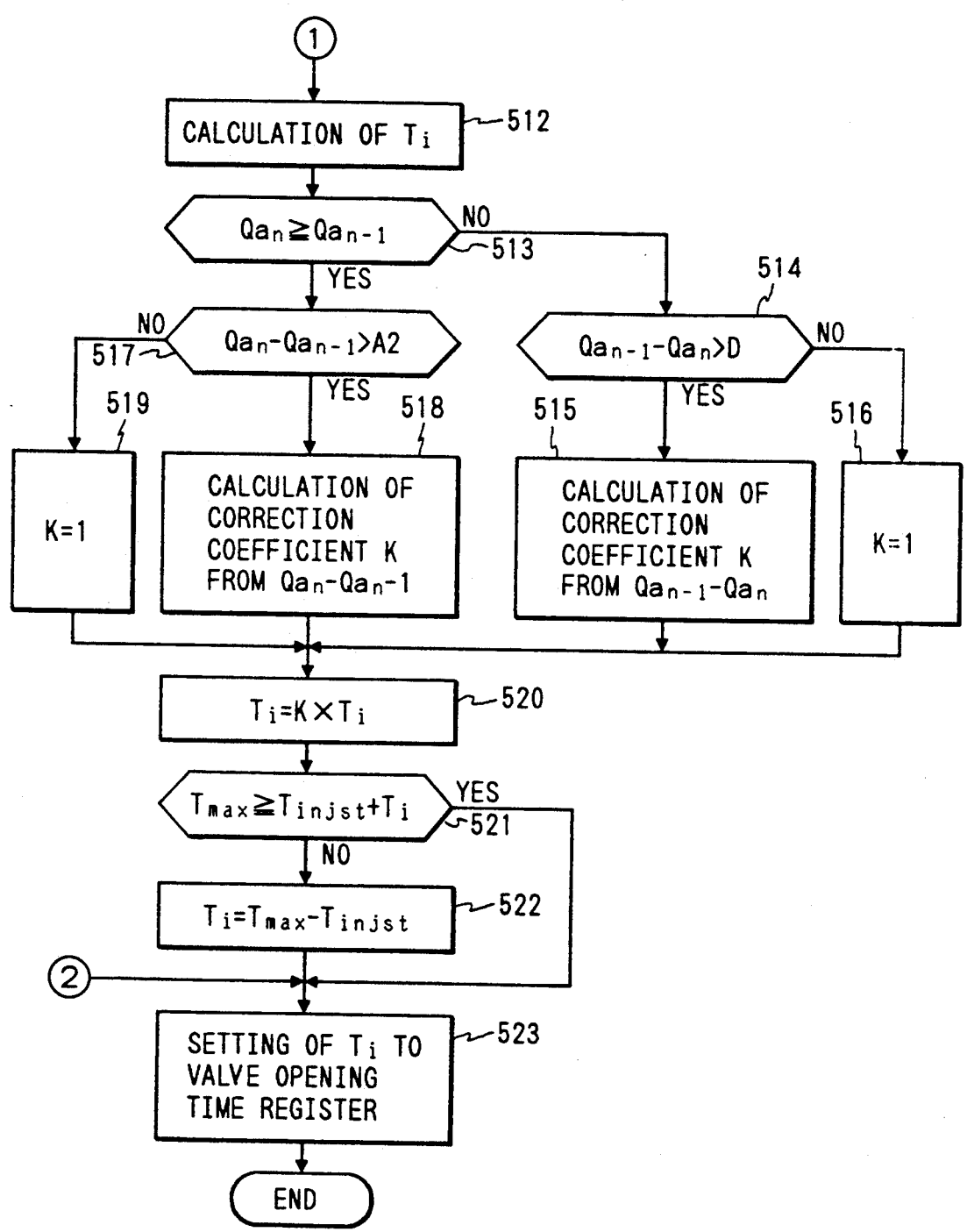

In FIGS. 18a and 18b, an intake air flow rate Qa is taken in step 501, and an engine speed (r.p.m.) N also is taken in step 502. Step 503 judges whether or not a flag Acc is 1, wherein the flag Acc=1 is a flag for expressing execution of an instantaneous fuel injection. When the flag Acc is 1, processing for returning to the usual processing for calculation of fuel injection amount (or time) is executed. Namely, in step 504 the content of a memory Ma is set to an injection start register, and the process proceeds to step 506 after the flag Acc is turned to 0 in step 505. The memory Ma, which is described later, operates to save the contents of the fuel injection start register temporarily. Further in the step 503, when the flag Acc is 0, the process proceeds to step 506 without doing anything.

Steps 506 to 511 are processes for the instantaneous injection of fuel at the time of rapid acceleration. In step 506, it is judged whether or not the engine is in a rapid acceleration. Namely, it is judged whether or not the difference between the previous intake air flow rate Qan-1 and the instant intake air flow rate Qan is equal to or larger than a prescribed value A1. The value A1 is set to be larger than a comparison level A2 used ct a slow acceleration which will be described later.

When the engine is in a rapid acceleration, the fuel injection start time Tinjst corresponding to the crank angle at the acceleration start in order to open instantaneously the injection valve 13 is calculated. In step 508, Tinjst stored in the injection start register before the acceleration is saved temporarily into the memory Ma. Namely, the value Tinjst is saved so as to be used again when calculation for usual fuel injection is restored after the instantaneous injection of fuel. In step 509, a fuel injection amount Ti corresponding to ar acceleration degree is calculated on the basis of a change in intake air flow rate Qan-Qan-1, an intake air flow rate Qan and an engine speed N (r.p.m.). The fuel injection start time Tinjst for instantaneous injection is set into the injection start register in step 510. In step 511, the flag Acc is set to 1, and the process proceeds to step 523.

Usually, the fuel injection amount (pulse width) Ti is effected according to the following equations $$Ti = PT \times COEF \times \alpha + Ts \qquad (a)$$

wherein TP is basic pulse width; (COEF, various correction constants; $\alpha$, $O_2$ feedback constant; TS, ineffective pulse width. The basic pulse width TP is obtained as follows:

$$TP = Ki \times Qan/N \qquad (b)$$

wherein Ki is injector correction constant. In step 509, instead of the equation (b), the following equation (c) is used for calculation of TP:

$$TP = Kj \times ((Qan - Qan - 1) + Qan)/N \qquad (c)$$

wherein Kj is constant. Therefore, Ti is obtained by the equations (a) and (c).

When the engine is not in a rapid acceleration, the process proceeds from step 506 to step 512 in which calculation for an usual fuel injection amount Ti is effected. Namely, in step 512, the fuel injection amount Ti is calculated on the basis of an intake air flow rate Qa and an engine speed N. In step 513, the previous intake air flow rate Qan-1 and the instant intake air flow rate Qan are compared, whereby whether the engine is in acceleration or in deceleration is judged. When the engine is in acceleration, the process proceeds to step 517 in which it is judged whether or not a change in intake air flow rate is equal to or more than a prescribed value A2. When the change is larger than the prescribed value A2, a correction constant K is calculated, corresponding to the change Qan-Qan-1. The correction constant K is set to be larger than 1 and to increase according to the change in intake air flow rate. In step 517, when the change in intake air flow rate is less than A2, the correction constant is set to 1 and the process proceeds to step 520.

In step 513, when it is judged that the engine is not in acceleration, it is judged whether or not the engine is in deceleration, the degree of which is larger than a prescribed value D. When it is larger than D, the correction constant K corresponding to the change in intake air flow rate is obtained in step 515, and then the process proceeds to step 520. On the other hand when the engine is in deceleration, the degree of which is less than the prescribed value D, the correction constant is set to 1, then the process proceeds to step 520.

In step 520, the fuel injection amount Ti calculated in step 512 is corrected with the correction constant, as follows:

$$Ti = Ti \times K.$$

In step 521, it is judged whether or not fuel injection time by the calculated fuel injection amount Ti exceeds the final injection period, that is, whether or not the following is satisfied:

$$Tmax \geq Tinjst + Ti.$$

When the fuel injection time exceeds the final injection period Tmax, the fuel injection amount Ti is corrected according to the equation Ti=Tmax—Tinjst in step 522 and the process goes to step 523. When the fuel injection time is not beyond the period, the correction as mentioned above is not effected and the process goes to step 523. In the step 523, the fuel injection amount Ti is set into the valve opening time indication register Ti, whereby the process is ended.

Another embodiment of the invention will be described hereunder referring to FIGS. 19 to 22.

Figure 19:
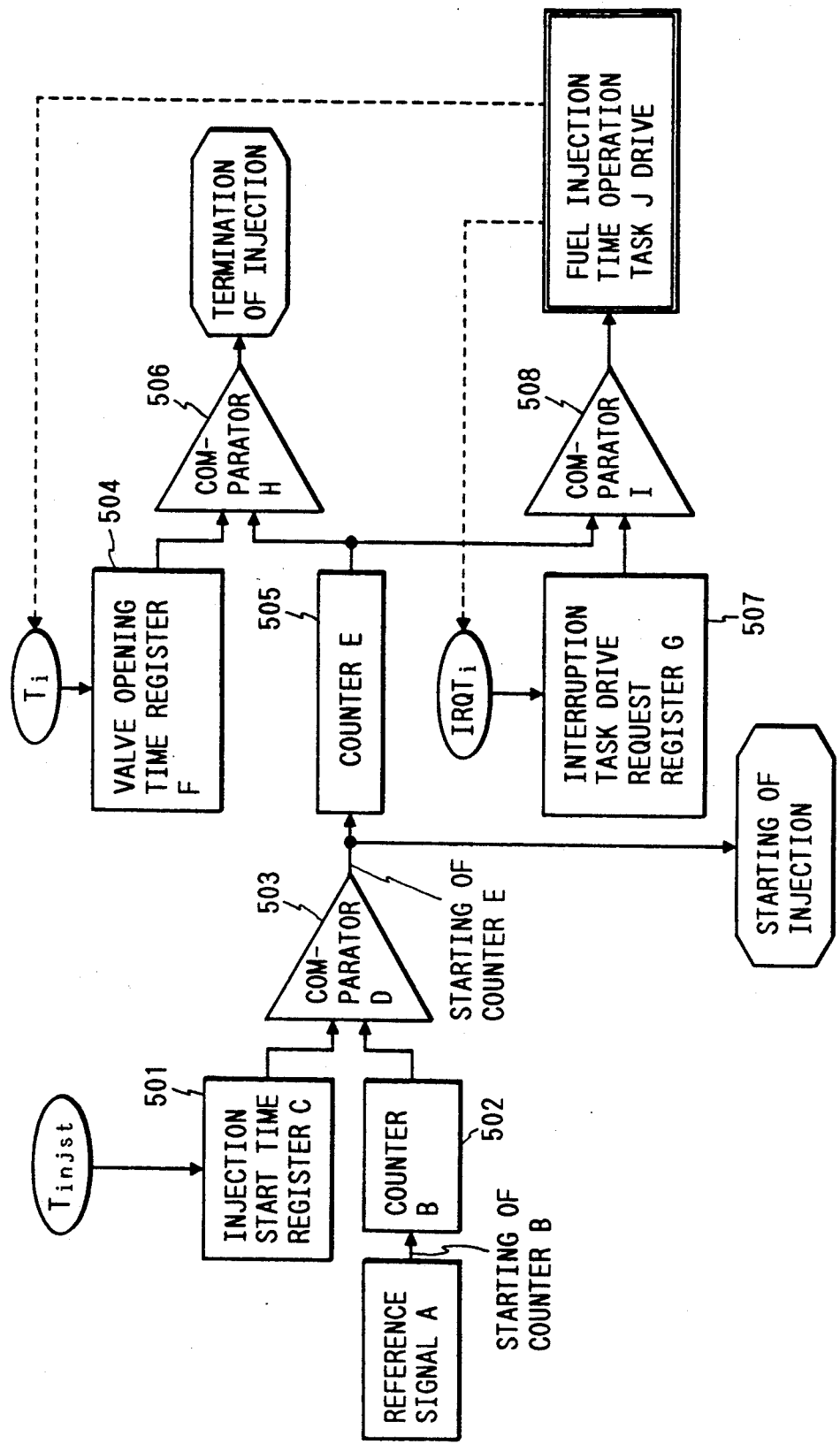
FIG. 19 is a block diagram of further another embodiment of the present invention.

FIG. 19 shows a circuit for sending valve opening signals to the fuel injection valve 13. The other constructions such as the system construction, the interruption handling routine at the reference signal generation time and each 10 msec interruption routine are the same as in the previously described embodiment.

In FIG. 19, a circuit for starting fuel injection comprises an injection start indication register C 501, a counter B 502 and a comparator D 503, and this circuit generates fuel injection start signals. The injection start time indication register C stores the injection start time Tinjst calculated in CPU. The counter B starts to count upon the receipt of the reference signal A outputted immediately before the compression stroke of each engine cycle. The comparator D 503 compares the content in the injection start time indication register C and the content in the counter B, and becomes high when both contents coincide with each other. When the comparator 103 becomes high, the injection valve 13 is opened and at the same time a counter E 505 starts to count. A circuit for fuel injection termination of the injection valve 13 comprises a valve opening time indication register F 504, the counter E 505 and a comparator H 506. Fuel injection time Ti calculated by the MPU is stored in the valve opening time indication register F 504. The counter E counts up each prescribed time, and the comparator H compares the content in the valve opening time indication register F and the content in the counter E, so as to become high when both the contents coincides with each other, whereby the fuel injection of the injection valve 13 is terminated.

An interruption task drive request register G 507, the counter E 505 and a comparator I 508 constitute a circuit for generating interruption request signals of a fuel injection time operation task J to the MPU. Operation task drive time IRQTi of fuel injection time from the MPU is stored in the interruption task drive request register G 507. The comparator I 508 compares the content in the interruption task drive request register G 507 and the content in the counter E 505 and becomes high when these values coincide to drive the fuel injection time operation task J, whereby the fuel injection amount Ti is calculated.

Figure 20:
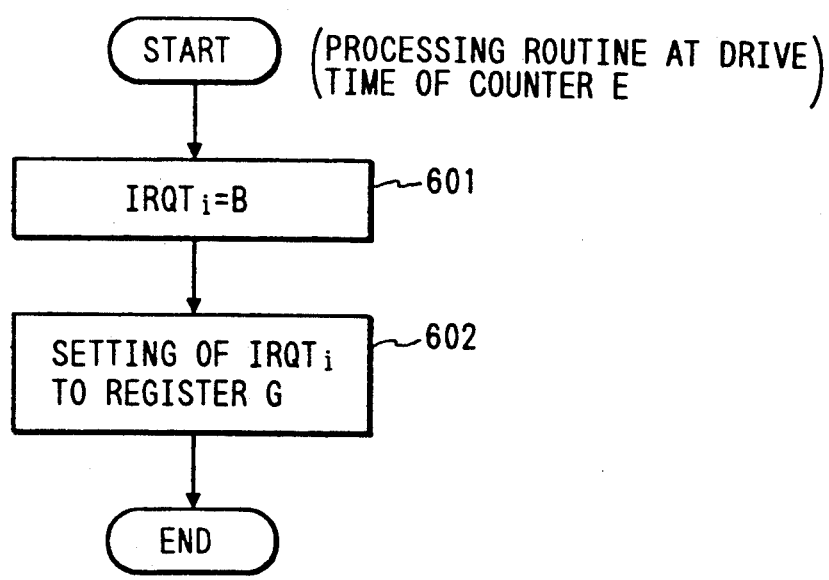
FIGS. 20 and 21 each are a flow chart for explaining the embodiment shown in FIG. 19.
Figure 21:
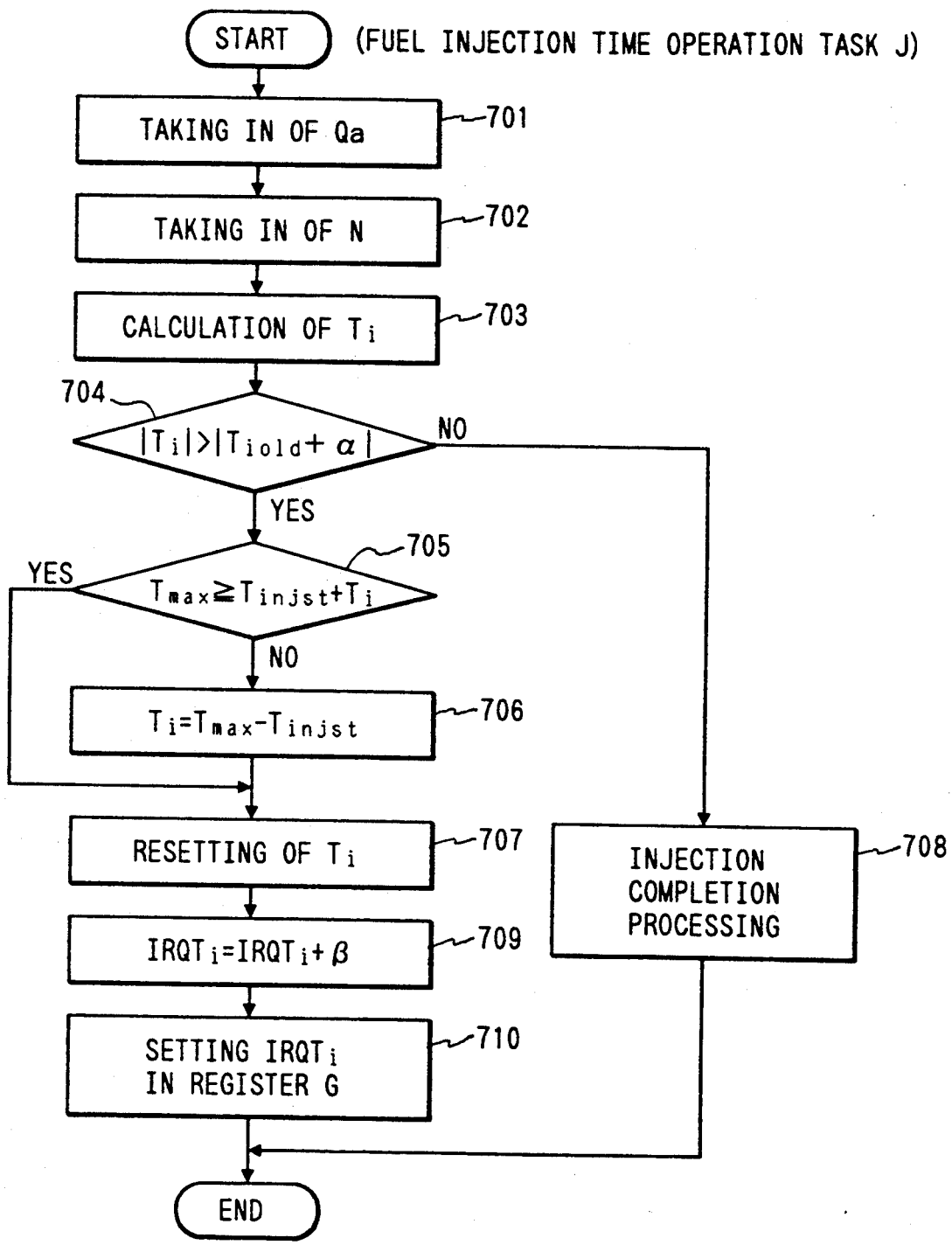

Next, operation of the MPU is described referring to FIGS. 20 and 21.

In FIG. 20, showing a flow chart for a drive time handling routine of counter E, the flow chart shows a process for setting a prescribed value B in the interruption task drive request register G. The processing illustrated by the flow chart is started simultaneously when the comparator D 503 is made high, and the counter E is started.

First of all, in step 601, the fuel injection time operation task drive time IRQTi is set to be B Next, the value B is set in the interruption task drive request register G, whereby the process is ended.

The operation task i of fuel injection time is described referring to FIG. 21. This flow chart of FIG. 21 shows a process for operation of fuel injection time Ti, and starts at each time the previously stated comparator I 508 becomes high. Namely, the task J is driven at each prescribed interval of time B until the injection valve 13 is closed after the valve 13 is opened.

In step 701, an intake air flow rate Qa is taken. Engine speed (r.p.m.) N also is taken in step 702. Fuel injection time Ti is calculated on the basis of the intake air flow rate Qa and the engine speed N in step 703.

In step 704 renewal judgement is effected, wherein the fuel injection time Tiold obtained through the previous calculation and the fuel injection time Ti obtained by instant calculation are compared and when the difference therebetween is within a renewal margin time α, the engine is judged not to be in acceleration or deceleration, as a result the fuel injection time Ti obtained through the instant calculation is kept as the content of the valve opening time indication register F 504. Namely, when the following expression (3) is not satisfied, the process proceeds to step 708, and the process is ended after handling for completion or fuel injection completion:

$$|Ti| > |Tiold+\alpha| \tag{3}$$

In step 704 when the above expression (3) is established, whether or not fuel injection for the injection time Ti obtained by instant calculation continues beyond the final injection time period Tmax is judged. When the injection is judged not to go beyond the time period Tmax, the process proceeds to step 707 in which the fuel injection time Ti is stored in the valve opening time indication register F. When the fuel injection is judged to continue beyond the time period Tmax, fuel injection time Ti is calculated so that the fuel injection terminates at the final fuel injection time period Tmax, based on the equation Ti=Tmax-Tinjst in step 706.

Step 709 is for restarting the flow chart again after 5 msec, wherein a prescribed value B is added to the fuel injection time operation drive time IRQTi. In step 710, the calculated IRQTi is set in the interruption task drive request register G, whereby the flow is ended.

Figure 22:
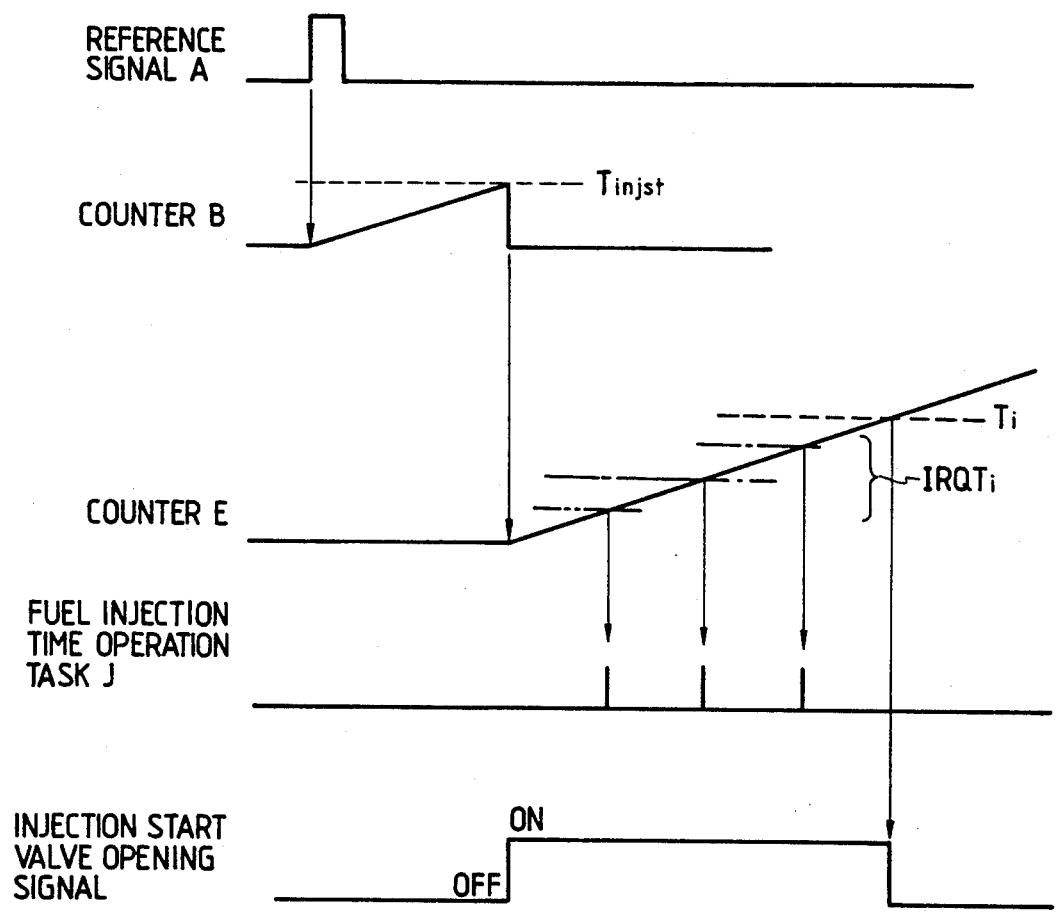
FIG. 22 is a timing chart explaining an operation of the embodiment shown in FIG. 19.

The operation is explained using a timing chart shown in FIG. 22.

In FIG. 22, when the reference signal is generated, the counter B 502 is driven to start counting up. When the value in the counter 502 becomes equal to a value Tinjst corresponding to the valve opening period of the fuel injection valve 13, the fuel injection start signal is generated whereby the fuel injection valve 13 is opened.

When the fuel injection valve 13 is opened, the counter E 505 is driven to start counting. Every time counter E becomes equal to the fuel injection time operation task drive time IRQTi, that is, every 3 msec, for example, 5 msec, the calculation task for fuel injection time is driven. The task is repeated until the fuel injection is completed.

When the content in the counter E 505 becomes equal to the fuel injection time Ti which is repeatedly calculated, the fuel injection valve 13 is closed.

In order to effect sure renewal of fuel injection time when an optimum fuel amount to be injected changes according to a change in engine conditions during fuel injection, it is necessary to calculate in a shorter cycle time than the fuel injection time occurring before the change in the engine conditions. This will be explained referring to FIG. 23.

Figure 23:
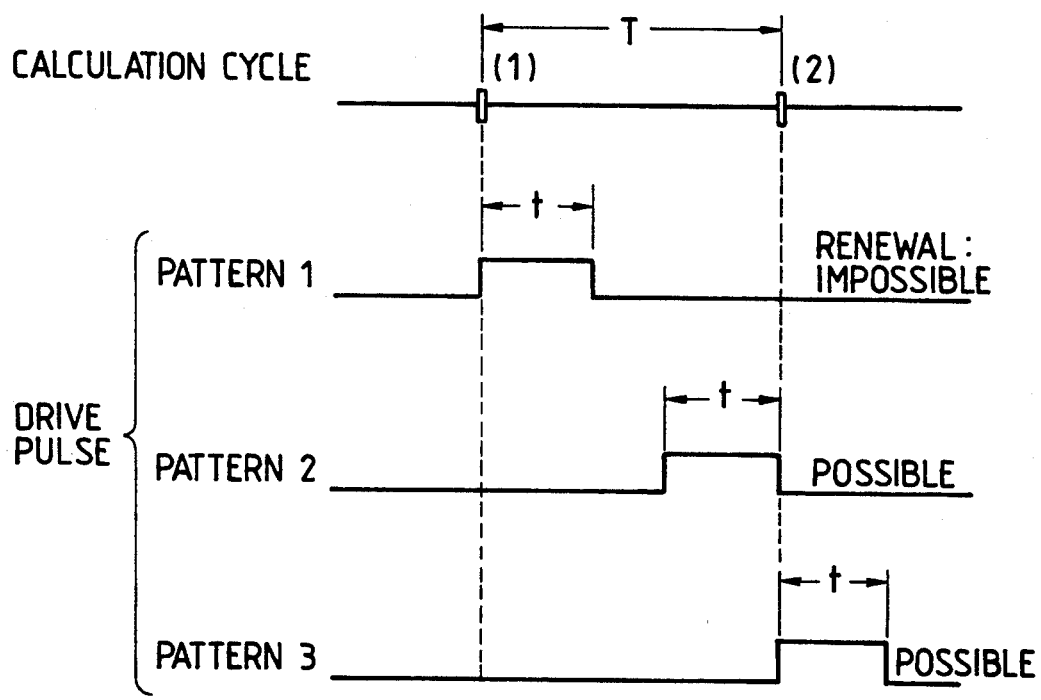
FIG. 23 is diagrams showing patterns of drive pulses.

In FIG. 23, it is shown whether or not the pulse width of (time) for driving the fuel injection valve can be renewed from a relationship between calculation time cycle T (time length from a position or time (1) to time (21)) and positions of pulses for driving the fuel Injection valve. In FIG. 23, pattern 1 can not be renewed because fuel injection by the fuel injection valve 13 is completed at the next calculation start time (2). In pattern 2 wherein calculation is effected immediately before completion of driving of the fuel injection time, renewal is possible. Further, in pattern 3, wherein calculation is carried out immediately after the start of opening of the fuel injection valve, it is shown that a renewal was effected referring to the pattern 1. The probability of renewal of the injection time or amount in FIG. 23 can be obtained by the following equation $$P = \frac{2t}{T + t}$$

wherein
T is the calculation cycle; t1 is the driving tine or injection time; p is the renewal probability.

Figure 24:
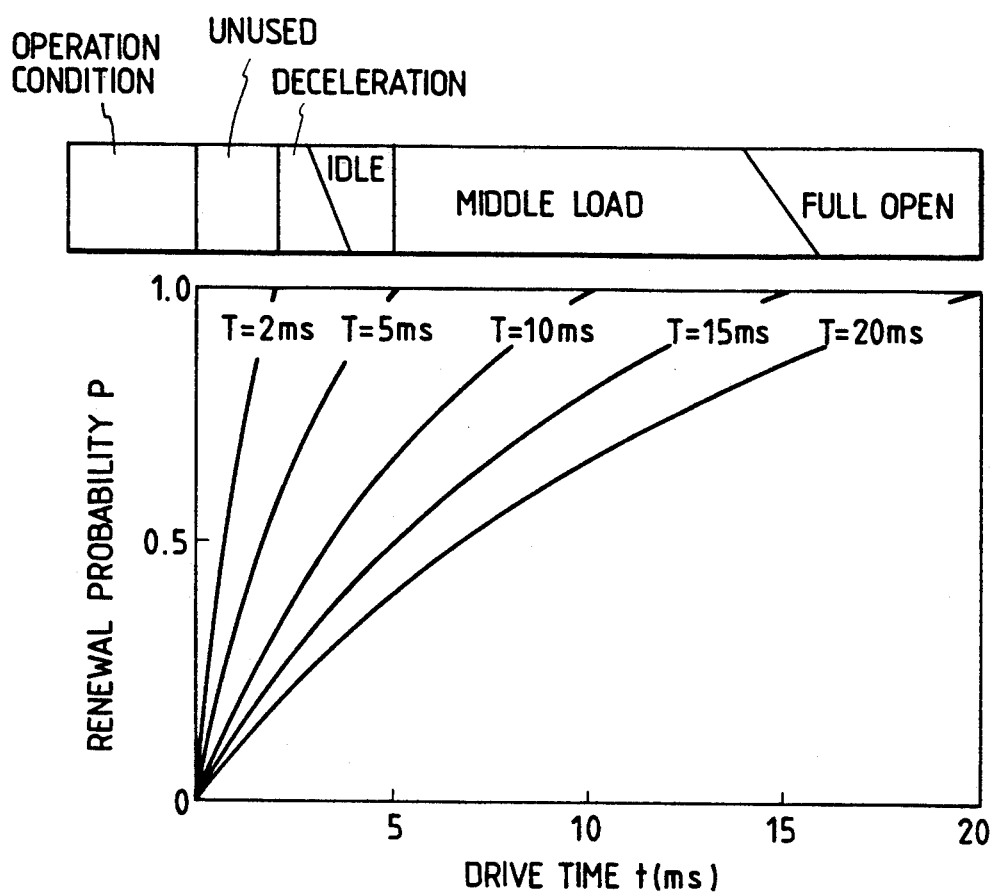
FIG. 24 is an illustration showing relation between renewal probability and drive time.

In FIG. 24, the relation between the renewal probability obtained by the above equation and the driving time t is shown. For example, in case the calculation cycle is 10 msec, there are some cases that renewal is not possible or the renewal probability is very small when the driving time or fuel injection time is less than 10 ms, and the probability P decreases to 0.66 when the driving time is 5 msec.

On the other hand, in FIG. 24, the engine operation conditions are classified into deceleration, idling, middle load, and full opening, which are shown at the upper portion of FIG. 24.

Figure 25:
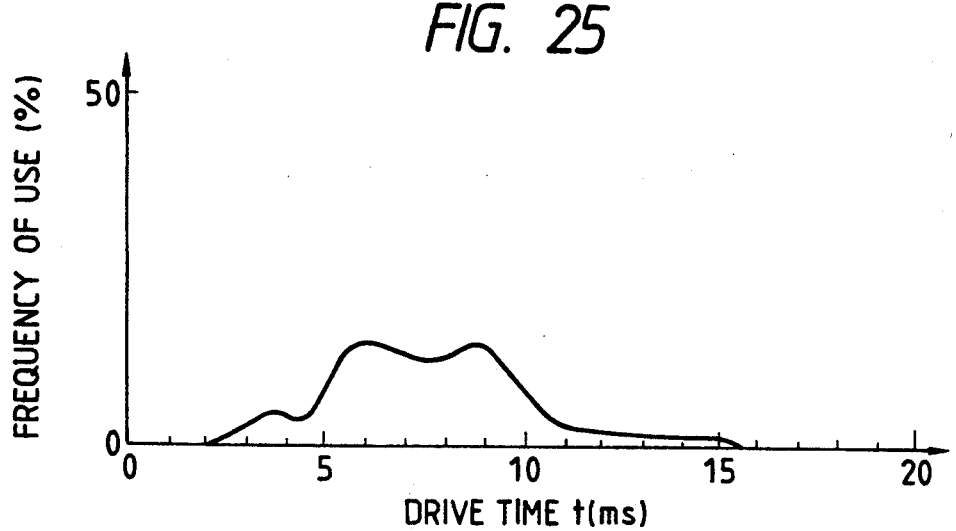
FIG. 25 is a graph showing frequency of use and drive time.

In FIG. 25, the usual use frequency of the driving time is shown. According to FIG. 25, the most high frequency is the middle load operation of 5 to 10 msec of driving time. Therefore, the desired effect can be obtained by use of the calculation cycle covering the middle load operation. An example the calculation cycle, is 5 msec.

It is more preferable to adopt a calculation cycle which is equal to or less than the minimum driving time (for example 2 msec) during the engine operation, because in the entire operation, renewal can be effected except for a fuel cutting time.

What is claimed is:

1. An engine control method for an engine having a plurality of intake passages associated with respective cylinders, comprising the steps of:
   detecting data representative of engine conditions including engine speed and intake air flow rate;
   determining a fuel injection amount necessary to run the engine under current engine conditions on the basis of the detected engine condition data;
   determining a fuel injection time in synchronism with rotation of the engine; and injecting fuel into an intake passage communicatable with the engine for a certain fuel injection time corresponding to the determined fuel injection amount, including:
  (a) beginning injection of the fuel amount determined in said step of determining a fuel injection amount to be injected into each intake passage at an optimum fuel injection start time for each cylinder; and
  (b) renewing the determined fuel injection amount at least once in a period of time from the start of fuel injection until completion of the fuel injection with a fuel injection amount calculated according to engine condition data obtained at fixed time intervals in said period of time during operation of the engine.

2. The engine control method according to claim 1 wherein each of said fixed time intervals has a time length less than the fuel injection time during an idling operation of the engine.

3. The engine control method according to claim 1, wherein a calculation of a fuel injection amount is effected synchronously with the injection starting time.

4. The engine control method according to claim 1, wherein all the fuel amount injected in an engine cycle is sucked into each engine cylinder in the same engine cycle.

5. The engine control method according to claim 1, wherein a fuel injection amount is calculated synchronously with engine rotation on the basis of a detected engine speed N and a detected flow rate of air, and the fuel injection amount is renewed by a fuel injection amount calculated at the fixed time intervals.

6. An engine control apparatus, comprising:
  means for detecting data representative of engine conditions, including engine speed and intake air flow rate;
  means for periodically calculating a fuel injection amount necessary to run the engine under the detected engine conditions on the basis of detected data at fixed time intervals, each fixed time interval being of such short duration that a calculated fuel injection amount can be renewed by an updated fuel injection amount at least once in a period of time from starting of fuel injection until completion of the fuel injection, during operation of the engine;
  means for determining a fuel injection start time optimum to each engine cylinder in synchronism with engine rotation; and
  means for injection fuel beginning at the optimum fuel injection start time into an intake passage communicable with the engine for a certain fuel injection time corresponding to a renewed fuel injection amount which is calculated during fuel injection.

7. The engine control apparatus according to claim 6, wherein means for injecting fuel includes fuel injection valves and a drive circuit for driving the fuel injection valves, said drive circuit being driven to open one of said fuel injection valves at an optimum fuel injection start time and to close said one fuel injection valve after lapse of a fuel injection time corresponding to said calculated renewed fuel injection amount.

8. An engine control apparatus, comprising:
  a plurality of sensors sensing engine conditions;
  calculation means for calculating repeatedly fuel injection amount at time intervals, each of which is a minimum fuel injection time or less, and for producing outputs representative of fuel injection amount;
  means for determining a fuel injection start time suitable to each engine cylinder and synchronous with engine rotation, and for producing outputs representative of fuel injection start time;
  a plurality of fuel injection valves provided correspondingly to the engine cylinders, respectively; and
  a drive circuit, electrically connected to said fuel injection valves, for driving said fuel injection valves individually according to said outputs of said means for determining a fuel injection start time and said means for calculating a fuel injection amount.

9. The engine control apparatus according to claim 8, wherein said calculation means is constructed so that all the fuel injection amount injected in an engine cycle is sucked into the engine cylinder in the same engine cycle.

10. The engine control apparatus according to claim 8, wherein said calculation means calculates synchronously with a time when a fuel injection valve starts to open.

11. The engine control apparatus according to claim 8, wherein said calculation means includes comparison means for comparing a fuel injection amount calculated previously and a fuel injection amount calculated currently, and means for stopping calculation for a period of time from a last calculation of fuel injection amount until completion of fuel injection when a difference as a result of the comparison is within a prescribed range.

12. The engine control apparatus according to claim 8, wherein said calculation means includes judgement means for judging a rapid acceleration of the engine and a slow acceleration of the engine, and calculating means for calculating a fuel amount for instant injection when the engine is in a state of rapid acceleration.

13. An engine control apparatus, comprising:
  calculation means for calculating a fuel injection amount on the basis of data representing engine conditions, said calculation means including a first register storing a calculated fuel injection amount and means for renewing the content in said first register in a cycle of a minimum fuel injection time or less, means for determining a fuel injection start time optimum to each engine cylinder on the basis of the fuel injection amount and the data representing engine conditions, a second register for storing the determined fuel injection start time, and a valve drive circuit for driving fuel injection valves individually according to valves stored in said first and second registers.

14. The engine control apparatus according to claim 13, wherein said calculation means effects renewal of the content stored in said first register only during a slow acceleration condition of the engine.

15. An engine control apparatus, comprising:
  a plurality of sensors for detecting engine conditions, calculation means for calculating a fuel injection amount on the basis of detected engine conditions, means for determining a fuel injection start time for each cylinder of the engine, and a drive circuit for opening fuel injection valves individually according to data from said calculation means and said means for determining fuel injection start time, wherein said calculation means includes means for taking in an output of said sensors in synchronism with opening of each fuel injection valve and for calculating a fuel injection amount at fixed time intervals of a minimum fuel injection time or less on the basis of an output of said sensors taken in synchronously with the opening of a fuel injection valve.

16. An engine control apparatus, comprising:
a plurality of sensors for detecting engine conditions, calculation means for calculating a fuel injection amount on the basis of detected engine conditions, and a drive circuit for driving fuel injection valves individually according to a calculated fuel injection amount, wherein said calculation means calculates repeatedly a fuel injection amount in fixed time intervals each of which is less than a fuel injection valve opening time during an idling operation of the engine.

17. The engine control apparatus according to claim 16, wherein said calculation means calculates a fuel injection amount several times during a load operation of the engine on the basis of detected engine conditions.

* * * * *